(12) United States Patent
Yamashita et al.

(10) Patent No.: US 8,933,793 B2
(45) Date of Patent: Jan. 13, 2015

(54) ACTIVE CONTACTLESS INFORMATION STORAGE DEVICE, METHOD, AND INFORMATION ACCESS SYSTEM

(75) Inventors: Daisuke Yamashita, Kawasaki (JP); Shinichi Shiotsu, Kawasaki (JP); Hiroyasu Sugano, Kawasaki (JP); Hideki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 254 days.

(21) Appl. No.: 13/303,630

(22) Filed: Nov. 23, 2011

(65) Prior Publication Data
US 2012/0133491 A1 May 31, 2012

(30) Foreign Application Priority Data
Nov. 29, 2010 (JP) ................. 2010-264998

(51) Int. Cl.
*H04Q 5/22* (2006.01)
*G06K 19/07* (2006.01)
(52) U.S. Cl.
CPC ........ *G06K 19/0702* (2013.01); *G06K 19/0723* (2013.01)
USPC ....................................... 340/10.5
(58) Field of Classification Search
None
See application file for complete search history.

(56) References Cited

U.S. PATENT DOCUMENTS

| 2006/0071756 A1* | 4/2006 | Steeves .................. 340/10.1 |
| 2008/0079549 A1 | 4/2008 | Yamada et al. |
| 2010/0085161 A1* | 4/2010 | Nishikawa ............... 340/10.3 |

FOREIGN PATENT DOCUMENTS

| JP | 2005-223497 A | 8/2005 |
| JP | 2006-338489   | 12/2006 |
| JP | 2008-83871 A  | 4/2008 |
| JP | 2008-244756 A | 10/2008 |

OTHER PUBLICATIONS

Japanese Office Action mailed Apr. 8, 2014 for corresponding of Japanese Patent Application No. 2010-264998, with Partial Translation, 5 pages.
Japanese Office Action mailed Jun. 24, 2014 for corresponding Japanese Patent Application No. 2010-264998, with Partial Translation, 4 pages.

* cited by examiner

*Primary Examiner* — Brian Zimmerman
*Assistant Examiner* — Thomas McCormack
(74) *Attorney, Agent, or Firm* — Fujitsu Patent Center

(57) ABSTRACT

An active contactless information storage device includes: an operation controller that determines whether mode information of the active contactless information storage device indicates a mode in which the device communicates with a reader/writer device; a carrier-sense controller that determines whether a first frequency in a first period and determines whether a second frequency in a second period, when the mode information of the active contactless information storage device indicates the mode in which the device communicates with the reader/writer device; and a command processor that performs communication with the reader/writer device when the carrier sense controller determines that the first frequency is sensed; wherein, when the mode information of the active contactless information storage device does not indicate the mode in which the active contactless information storage device communicates with the reader/writer device, the carrier-sense controller waits for a predetermined amount of time.

5 Claims, 17 Drawing Sheets

ACTIVE CONTACTLESS INFORMATION STORAGE DEVICE, METHOD, AND INFORMATION ACCESS SYSTEM

CROSS-REFERENCE TO RELATED APPLICATIONS

This application is based upon and claims the benefit of priority of prior Japanese Patent Application No. 2010-264998, filed on Nov. 29, 2010, the entire contents of which are incorporated herein by reference.

FIELD

The disclosure herein relates to an active contactless information storage device and an information access system.

BACKGROUND

Examples of active contactless information storage devices having batteries therein include contactless IC (integrated circuit) cards, contactless IC tags, and RFID (Radio Frequency IDentification) tags. For example, RFID tags are attached to products and are carried by users. The RFID tags transmit information regarding the products or the users by using RF (radio frequency) signals with a predetermined frequency. The RF signals transmitted from the RFID tags are read by a reader device having a reading function and are processed by, for example, a host apparatus, such as a computer, so that the resulting information can be used, for example, for monitoring and managing distribution of the products or actions of the users. A writer device having a writing function may be used to transmit and write predetermined information to the RFID tags.

The active RFID tags having batteries therein can communicate over a relatively long distance, compared to passive RFID tags that contactlessly receive power from, for example, a reader/writer device having reading and writing functions. The active RFID tags are broadly classified into periodic-spontaneous-communication-type RFID tags and standby-communication-type RFID tags. The spontaneous-communication-type RFID tag is configured to perform communication at regular intervals based on a clock or the like built into the RFID tag and to sleep in other periods of time, thereby reducing the power consumption. On the other hand, the standby-communication-type RFID tag is configured to wait for, for example, a call (a radio wave) from the reader/writer device to perform communication, without initiating the communication.

In order to sense the call from the reader/writer device, the standby-communication-type RFID tag is adapted to constantly perform carrier sense at regular intervals. The carrier sense involves a period for sensing a signal from the reader/writer device and a period for detecting a signal from other active RFID tags that are present in a range in which they can communicate with the reader/writer device. Provision of the latter carrier-sense period makes it possible to prevent, when one active RFID tag starts transmission to the reader/writer device while another active RFID tag is performing transmission to the reader/writer device, radio-wave interference between the RFID tags from occurring. Since the active RFID tag performs carrier sense at regular intervals in periods other than when communicating with the reader/writer device, as described above, the power consumption is relatively large and the amount of load on the battery in the active RFID tag is relatively large (e.g., Japanese Unexamined Patent Application Publication No. 2006-338489).

SUMMARY

According to an aspect of the invention, an active contactless information storage device having a battery therein, the device includes: an operation controller that determines whether mode information of the active contactless information storage device indicates a mode in which the active contactless information storage device communicates with a reader/writer device, by referring to a storage unit in which the mode information is stored; a carrier-sense controller that determines whether a first frequency used for communication with the reader/writer device is sensed in a first period and determines whether a second frequency used for communication with other active contactless information storage devices is sensed in a second period, when the mode information of the active contactless information storage device indicates the mode in which the active contactless information storage device communicates with the reader/writer device; and a command processor that performs communication with the reader/writer device when the carrier sense controller determines that the first frequency is sensed; wherein, when the mode information of the active contactless information storage device does not indicate the mode in which the active contactless information storage device communicates with the reader/writer device, the carrier-sense controller waits for a predetermined amount of time.

The object and advantages of the invention will be realized and attained by at least the features, elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
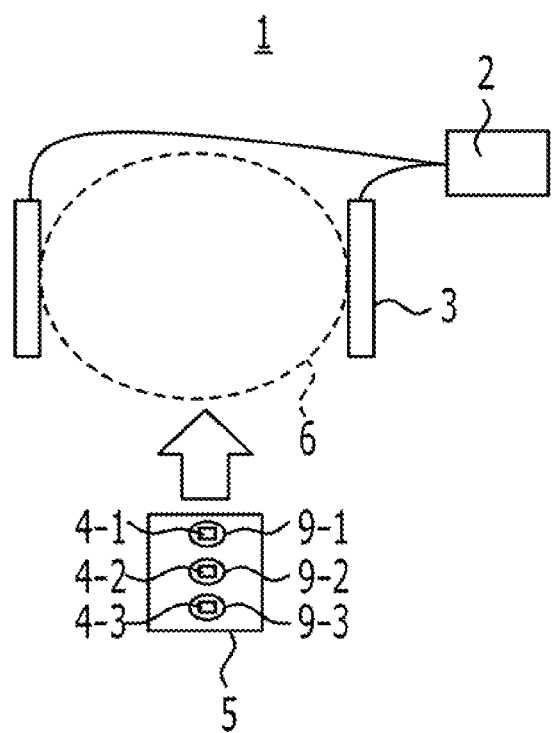
FIG. 1 illustrates an example of an information access system of related art using active RFID tags.

FIG. 1 illustrates one example of an information access system of related art using active RFID tags. An information access system 1 includes a reader/writer (R/W) device 2, an antenna 3, and active RFID tags 4-1 to 4-3. In this example, for convenience of description, it is assumed that three RFID tags 4-1 to 4-3 are attached to three individual products 9-1 to 9-3, respectively, and the three products 9-1 to 9-3 are placed on a carriage 5 and are conveyed. Each of the RFID tags 4-1 to 4-3 can communicate with the R/W device 2, upon entering a range 6 that can be covered by the antenna 3 (i.e., upon entering a communication range). The carriage 5 moves, for example, in a direction indicated by the arrow in FIG. 1.

Figure 2:
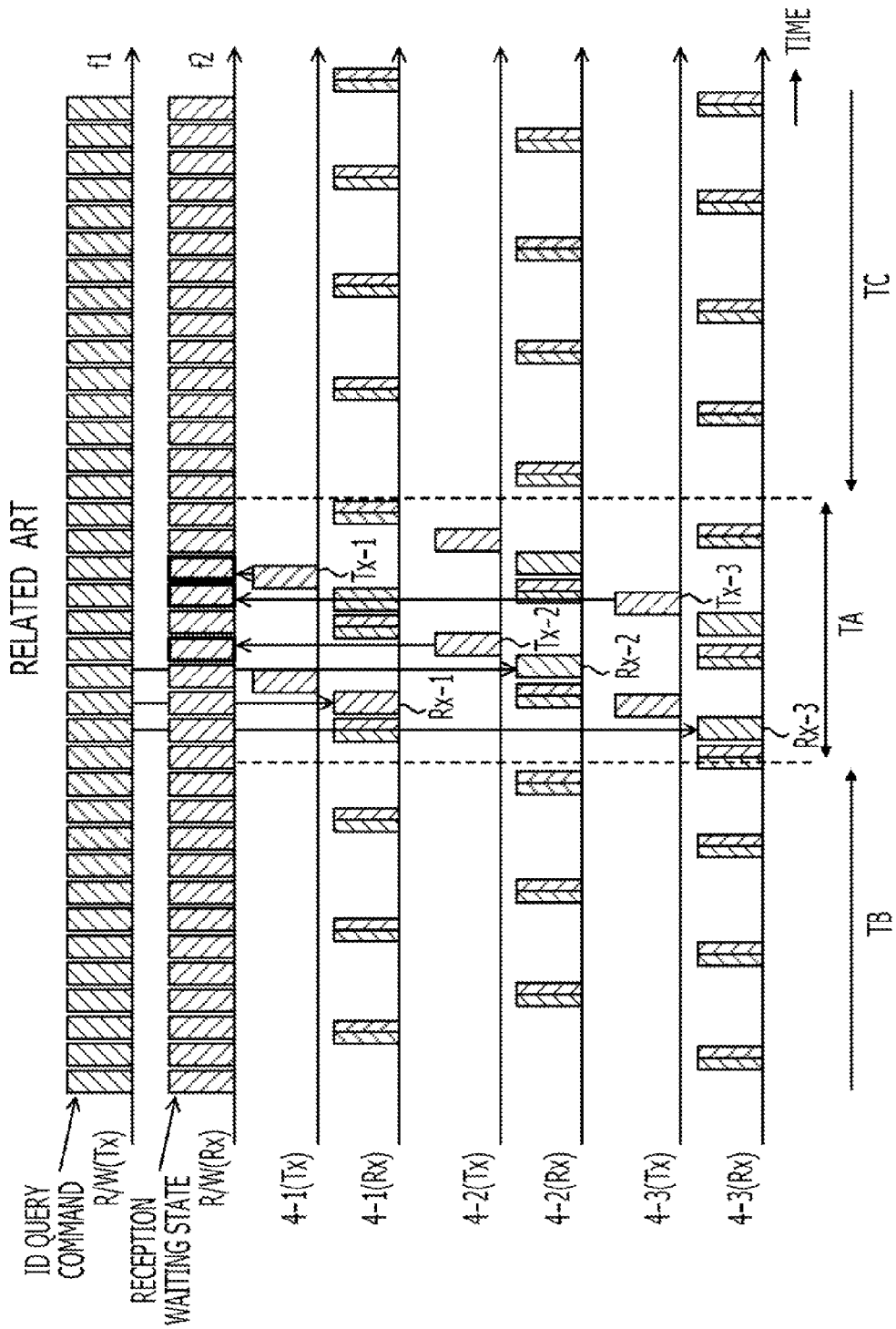
FIG. 2 is a timing chart illustrating exemplary operations of the information access system.

FIG. 2 is a timing chart illustrating exemplary operations of the information access system 1. In FIG. 2, R/W(Tx) indicates timings at which the R/W device 2 transmits commands (or ID (identifier) query commands) for querying about information, such as a tag ID for identifying each of the RFID tags 4-1 to 4-3. R/W(Rx) indicates reception waiting timings (or reception waiting states) of the R/W device 2. Also, f1 indicates a transmission frequency and f2 indicates a reception frequency, where f1≠f2. Also, 4-1(Tx) to 4-3(Tx) indicate timings at which the RFID tags 4-1 to 4-3 transmit RF signals and 4-1(Rx) to 4-3(Rx) indicate timings at which the RFID tags 4-1 to 4-3 receive RF signals. The left-downward hatching indicates a carrier-sense period in which signals from the R/W device 2 are detected. The right-downward hatching indicates a carrier-sense period in which signals from the RFID tags other than the local RFID tag are detected. In periods denoted by thick, bold lines, the R/W device 2 performs reception processing for receiving information of tag IDs and so on from the RFID tags 4-1 to 4-3.

In FIG. 2, communications between the R/W device 2 and the RFID tags 4-1 to 4-3 are performed in a period TA when the RFID tags 4-1 to 4-3 are present in the range 6, after the carriage 5 moves in the direction indicated by the arrow in FIG. 1. At timings Rx-1 to Rx-3, the RFID tags 4-1 to 4-3 receive the ID query commands from the R/W device 2. At timings Tx-1 to Tx-3, the RFID tags 4-1 to 4-3 transmit respective pieces of ID information to the R/W device 2.

In periods TB and TC when the RFID tags 4-1 to 4-3 are absent in the range 6 and are in waiting states, the R/W device 2 and the RFID tags 4-1 to 4-3 do not communicate with each other but each of the RFID tags 4-1 to 4-3 perform carrier sense at regular intervals. Thus, the power consumed by each of the RFID tags 4-1 to 4-3 is relatively large when the power consumed thereby in the periods TB and TC is included, since the periods TB and TC are longer than the period TA. When the number of RFID tags increases, the power consumption also increases correspondingly.

According to an active contactless information storage device and an information access system according to the disclosure herein, during synchronization processing, the active contactless information storage device communicates with other active contactless information storage devices in a first mode or a second mode on the basis of identification information and mode information stored in a storage unit. In the first mode, the active contactless information storage device transmits the identification information and the mode information of the (local) active contactless information storage device and the other active contactless information storage devices, the identification information and the mode information being stored in the storage unit, to the other active contactless information storage devices. The active contactless information storage device also receives the identification information and the mode information from the other active contactless information storage devices and stores the identification information and the mode information in the storage unit. After the synchronization processing, the active contactless information storage device periodically repeats a first sensing period for sensing a first signal from an external reading device and a second sensing period for sensing a second signal from the other active contactless information storage devices. On the other hand, in the second mode, the active contactless information storage device receives the identification information and the mode information from the other active contactless information storage devices and stores the identification information and the mode information in the storage unit. The active contactless information storage device transmits the identification information and the mode information of the local device and the other active contactless information storage devices, the identification information and the mode information being stored in the storage unit, to the other active contactless information storage devices. After the synchronization processing, the active contactless information storage device enters a power-saving state that does not involve the signal sensing period.

Embodiments of the active contactless information storage device and the information access system according to the disclosure herein will be described below with reference to the accompanying drawings.

[Embodiments]

(First Embodiment)

Figure 3:
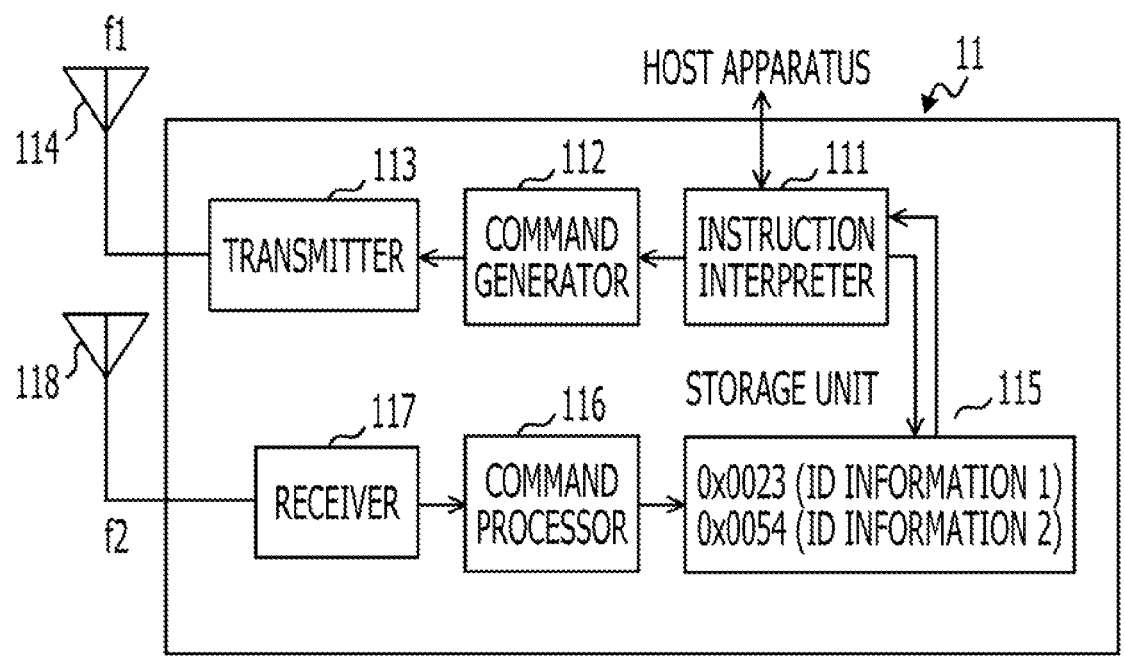
FIG. 3 is a block diagram illustrating an example of the configuration of a reader/writer device in a first embodiment of the present invention.

FIG. 3 is a block diagram illustrating one example of the configuration of a reader/writer (R/W) device in a first embodiment of the present invention. The R/W device is one example of an external reading device that has at least a reading function and that may have a writing function in addition to the reading function. An R/W device 11 illustrated in FIG. 3 has an instruction interpreter 111, a command generator 112, a transmitter 113, an antenna 114, a storage unit 115, a command processor 116, a receiver 117, and an antenna 118.

The instruction interpreter 111 interprets an instruction (or a request) supplied from, for example, external equipment, such as a host apparatus (not illustrated), and also stores the instruction in the storage unit 115. On the basis of the instruction interpreted by the instruction interpreter 111, the command generator 112 generates a command interpretable by both of the R/W device 11 and an RFID tag (described below). The command generated by the command generator 112 is transmitted to the RFID tag via the transmitter 113 and the antenna 114. On the other hand, a command transmitted from the RFID tag and received via the antenna 118 and the receiver 117 is interpreted by the command processor 116 and the interpreted command is stored in the storage unit 115 and is also output to, for example, the external equipment, such as the host apparatus.

The command generator 112 may encode generated data in accordance with a predetermined coding system. In such a case, the transmitter 113 modulates a carrier with baseband encoded data from the command generator 112 and transmits a resulting signal (e.g., an ID query command) with a frequency f1. The receiver 117 demodulates a received RF signal to generate baseband encoded data and generates data indicating a carrier strength of the received RF signal. In addition, on the basis of the carrier-strength-indicative data from the receiver 117, the command processor 116 determines whether or not a carrier of the received RF signal is present and determines whether the frequency of the carrier is a frequency f1 or a frequency f2 (f1≠f2). The command processor 116 further decodes the carrier-strength-indicative data in accordance with a predetermined coding system to generate decoded data, stores the decoded data in the storage unit 115, and outputs the decoded data to the host apparatus.

The configuration of the R/W device 11 is not limited to the configuration illustrated in FIG. 3. The R/W device 11 is not particularly limiting, as long as it has a configuration that can communicate with an active contactless information storage device (e.g., an active RFID tag) described below and that sequentially transmits a signal (e.g., an ID query command) with a frequency f1 and has a reception waiting state in which the R/W device 11 can sequentially receive a signal (e.g., an RF signal) with a frequency f2 (f1≠f2) from the active contactless information storage device.

Figure 4:
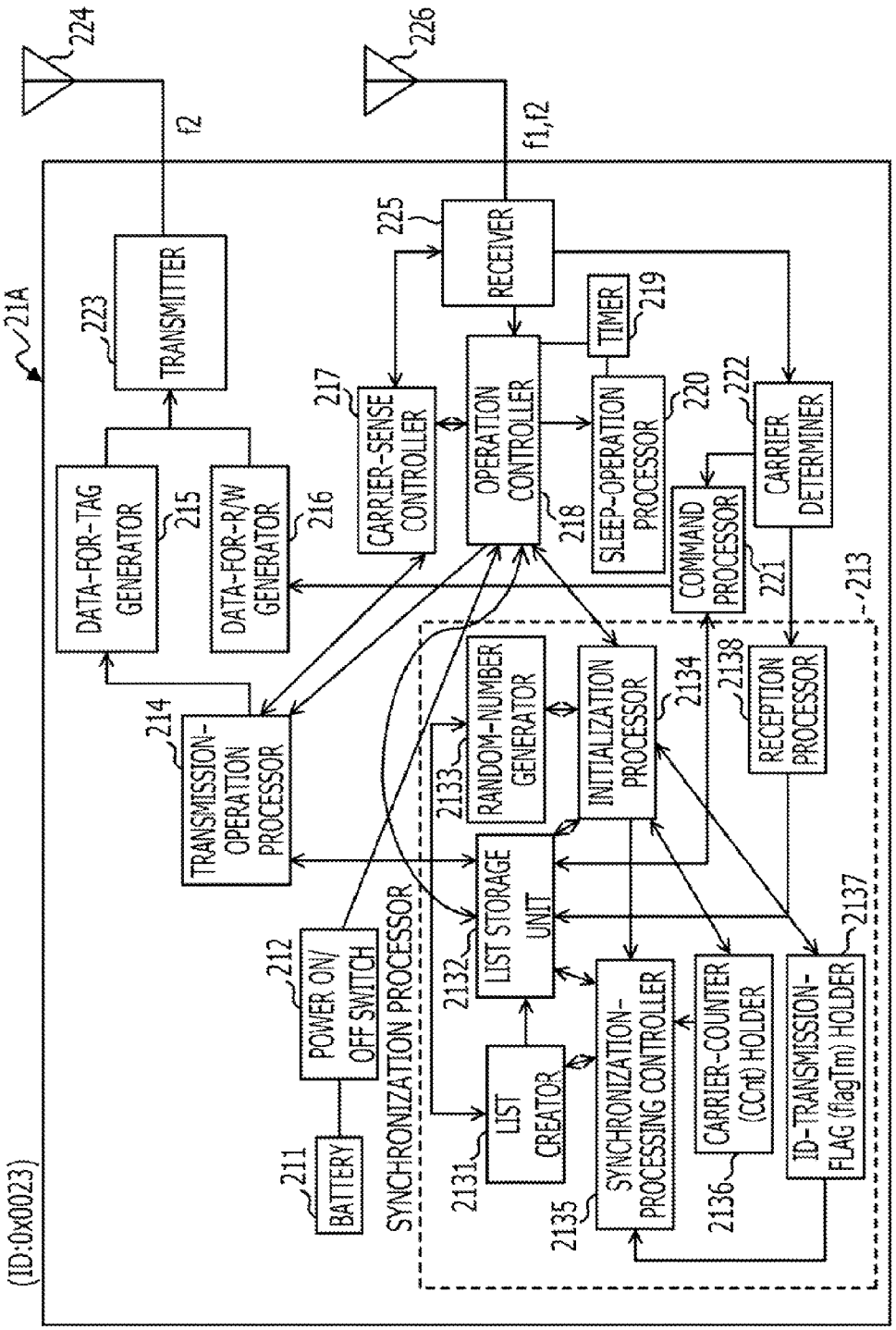
FIG. 4 is a block diagram illustrating an example of an RFID tag in the first embodiment.

FIG. 4 is a block diagram illustrating one example of an RFID tag in the first embodiment. The RFID tag is one example of the active contactless information storage device. An RFID tag 21A illustrated in FIG. 4 includes a battery 211, a power on/off switch 212, a synchronization processor 213, a transmission-operation processor 214, a data-for-tag generator 215, a data-for-R/W generator 216, a carrier-sense controller 217, an operation controller 218, a timer 219, a sleep-operation processor 220, a command processor 221, a carrier determiner 222, a transmitter 223, an antenna 224, a receiver 225, and an antenna 226. The battery 211 supplies power to the individual units in the RFID tag 21A. The power on/off switch 212 controls the ON or OFF of power supplied from the power source (e.g., the battery 211) in the RFID tag 21A.

The synchronization processor 213 includes a list creator 2131, a list storage unit 2132, a random-number generator 2133, an initialization processor 2134, a synchronization-processing controller 2135, a carrier-counter holder 2136, an ID-transmission-flag holder 2137, and a reception processor 2138.

The carrier-sense controller 217 periodically performs carrier sense in cooperation with the timer 219. The command processor 221 interprets a command received via the antenna 226 and the receiver 225. The carrier determiner 222 determines whether the frequency of the carrier is the transmission frequency f1 of the external R/W device 11 or the reception frequency f2 of the R/W device 11 (e.g., the transmission frequency of the RFID tag 21A). Under the control of the command processor 221, the data-for-R/W generator 216 generates data that complies with a communication protocol of the R/W device 11. Under the control of the transmission-operation processor 214, the data-for-tag generator 215 generates data that complies with a communication protocol of another RFID tag 21A. The transmitter 223 transmits the data, generated by the data-for-R/W generator 216 or the data-for-tag generator 215, via the antenna 224.

The data-for-R/W generator 216 and the data-for-tag generator 215 may encode the generated data in accordance with the predetermined coding system. In this case, the transmitter 223 modulates a carrier with the baseband encoded data from the data-for-R/W generator 216 or the data-for-tag generator 215 and transmits an RF signal with the frequency f1 or the frequency f2. The receiver 225 demodulates a received RF signal to generate baseband encoded data and generates data indicating a carrier strength of the received RF signal. In addition, the carrier determiner 222 determines the presence/absence of a received RF signal and determines the frequency thereof on the basis of the carrier-strength-indicative data from the receiver 225 and also decodes the carrier-strength-indicative data in accordance with the predetermined coding system to generate decoded data.

On the basis of information of a role list described below, the operation controller 218 performs allocates and manages the sleep operation (or the power-saving operation) and the synchronization processing. The sleep mode and the synchronization processing are described below. The sleep-operation processor 220 monitors the timer 219 to perform a sleep operation until a specified time is reached. On the basis of data stored in the list storage unit 2132, the transmission-operation processor 214 controls transmission of data (e.g., an ID list containing identification information (such as a tag ID) for identifying the RFID tag 21A) to the R/W device 11 and transmission of data (e.g., an ID list and a role list containing roles) to other RFID tags 21A during the synchronization processing.

Upon start of synchronization processing, the initialization processor 2134 in the synchronization processor 213 initializes the values of parameters, such as the ID list, the role list, an ID transmission flag flagTm, a carrier counter value CCnt, and the number "n" of other RFID tags 21A, and so on. The synchronization-processing controller 2135 determines whether or not the synchronization processing is to be ended and determines data transmission timing, on the basis of the carrier counter value CCnt held by the carrier-counter holder 2136 and the ID transmission flag flagTm held by the ID-transmission-flag holder 2137. The random-number generator 2133 generates a random number required for role assignment. The reception processor 2138 stores, in the list storage unit 2132, the ID list, the role list, and so on received from the RFID tag 21A. On the basis of a random number generated by the random-number generator 2133, the list creator 2131 assigns a role to each RFID tag 21A. The carrier-counter holder 2136 counts a condition for ending the synchronization processing (e.g., counts the number of carrier senses) and holds the resulting carrier count value CCnt. The ID-transmission-flag holder 2137 holds the ID transmission flag flagTm indicating whether or not the tag ID of the local RFID tag 21A has been transmitted to another RFID tag 21A. The carrier counter value CCnt held by the carrier-counter holder 2136 is used to end the synchronization processing, when no carrier can be sensed after the carrier sense is performed a specified number of times (e.g., 100 times).

The information access system in the present embodiment may be configured to include an R/W device, an antenna, and multiple active RFID tags, as illustrated in the information access system 1 of FIG. 1. Consequently, a description and illustration of such a configuration are omitted. In the present embodiment, however, the R/W device 11 illustrated in FIG. 3 is used instead of the R/W device 2 and active RFID tags 21A-1 to 21A-3 having substantially the same configuration as the active RFID tag 21A in FIG. 4 are used instead of the active RFID tags 4-1 to 4-3. In the following example, for convenience of description, it is assumed that three RFID tags 21A-1 to 21A-3 are attached to three products 9-1 to 9-3 (as illustrated in FIG. 1), respectively, and the three products 9-1 to 9-3 are placed on a carriage corresponding to the carriage 5 and are conveyed. It is also assumed that each of the RFID tags 21A-1 to 21A-3 can communicate with the R/W device 11 upon entering a range (corresponding to the range 6 illustrated in FIG. 1) that can be covered by an antenna corresponding to the antenna 3 illustrated in FIG. 1.

Figure 5:
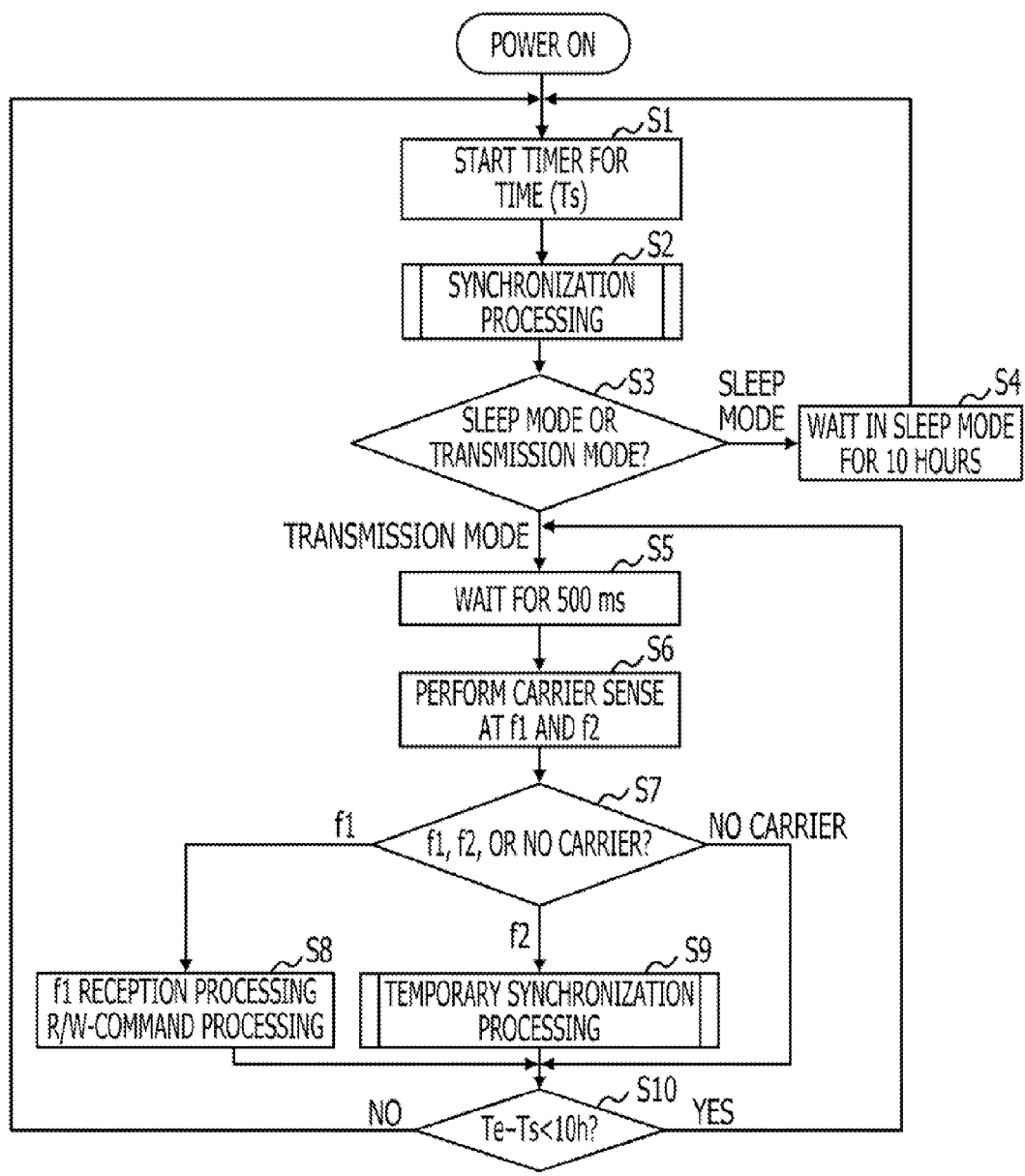
FIG. 5 is a flowchart illustrating exemplary operations of the RFID tag in the first embodiment.

FIG. 5 is a flowchart illustrating exemplary operations of one RFID tag in the first embodiment. The processing in FIG. 5 is started when the RFID tag 21A is powered on upon turning on of the power on/off switch 212 therefor. In operation S1, the operation controller 218 performs timer-start processing for starting the timer 219 for managing time Ts. In operation S2, the synchronization processor 213 performs synchronization processing described below with reference to FIG. 6. In the synchronization processing, the RFID tags 21A in the communication range exchange information regarding the tag IDs and the roles. The types of the roles include a representative and a sleep. The RFID tag 21A whose role is the representative has a first mode for transmitting information including the tag IDs of the local and other RFID tags 21A (e.g., for making a response) to the R/W device 11 in response to the ID query command. The first mode will hereinafter be referred to as an "active mode" or "transmission mode". The RFID tag 21A whose role is the sleep is a non-representative RFID tag 21A, and has a second mode in which no response is made to the ID query command and the information including the tag ID is not transmitted to the R/W device 11, thereby minimizing the power consumption. The second mode will hereinafter be referred to as a "power-saving mode" or "sleep mode". The RFID tag 21A in the transmission mode has a carrier-sense period for detecting a signal from the R/W device 11 and a carrier-sense period for detecting a signal from the RFID tags 21A other than the local RFID tag 21A. After exchanging the information with the other RFID tags 21A during the synchronization processing, the RFID tag 21A in the sleep mode has neither the carrier-sense period for detecting a signal from the R/W device 11 nor the carrier-sense period for detecting a signal from the RFID tags 21A other than the local RFID tag 21A, and performs a sleep operation in which the power consumption is minimized, until the next synchronization processing. Thus, the power consumption is considerably reduced, compared to the RFID tag 21A in the transmission mode.

In operation S3, the operation controller 218 determines whether the role of the RFID tag 21A is the sleep or the representative, on the basis of the data stored in the list storage unit 2132. That is, in operation S3, the operation controller 218 determines whether the operation mode of the RFID tag 21A is the sleep mode or the transmission mode, by referring to the role of the local RFID tag 21A, the role being stored in the list storage unit 2132. When the result of the determination in operation S3 indicates that the operation mode of the RFID tag 21A is the sleep mode, the process proceeds to operation S4 in which the sleep-operation processor 220 causes the RFID tag 21A to wait in the sleep mode for a predetermined period of time (e.g., 10 hours). After the waiting, the process returns to operation S1.

On the other hand, when the result of the determination in operation S3 indicates that the operation mode of the RFID tag 21A is the transmission mode, the process proceeds to operation S5 in which the operation controller 218 causes the RFID tag 21A that has completed the synchronization processing to wait for a predetermined amount of time (e.g., 500 ms). After the predetermined amount of time passes, in operation S6, the carrier-sense controller 217 performs carrier sense at the frequencies f1 and f2 via the antenna 226 and the receiver 225. In the carrier-sense period for detecting a signal from the R/W device 11, the carrier-sense controller 217 performs carrier sense at the frequency f1, and in the carrier-sense period for detecting a signal from the RFID tags 21A other than the local RFID tag 21A, the carrier-sense controller 217 performs carrier sense at the frequency f2. In operation S7, the carrier determiner 222 determines whether or not a carrier is sensed by the carrier sense and determines whether the frequency of the sensed carrier is f1 or f2. When the result of the determination in operation S7 indicates that no carrier is sensed, the process proceeds to operation S10. When the result of the determination in operation S7 indicates that a carrier with the frequency f1 is sensed, the process proceeds to operation S8 in which the command processor 221 performs processing for receiving the carrier with the frequency f1 and R/W-command processing for processing an ID query command received from the R/W device 11. Thereafter, the process proceeds to operation S10. When the result of the determination in operation S7 indicates that a carrier with the frequency f2 is sensed, the process proceeds to operation S9 in which the command processor 221 performs temporary synchronization processing described below with reference to FIG. 8. Thereafter, the process proceeds to operation S10. In operation S10, the operation controller 218 determines whether or not a difference obtained by subtracting the time Ts managed by the timer 219 from a preset time Te is smaller than a predetermined period (e.g., 10 hours), i.e., determines whether or not Te−Ts<10 h is satisfied. When the result of the determination in operation S10 is YES, the process returns to operation S5. When the result of the determination in operation S10 is NO, the process returns to operation S1.

Figure 6:
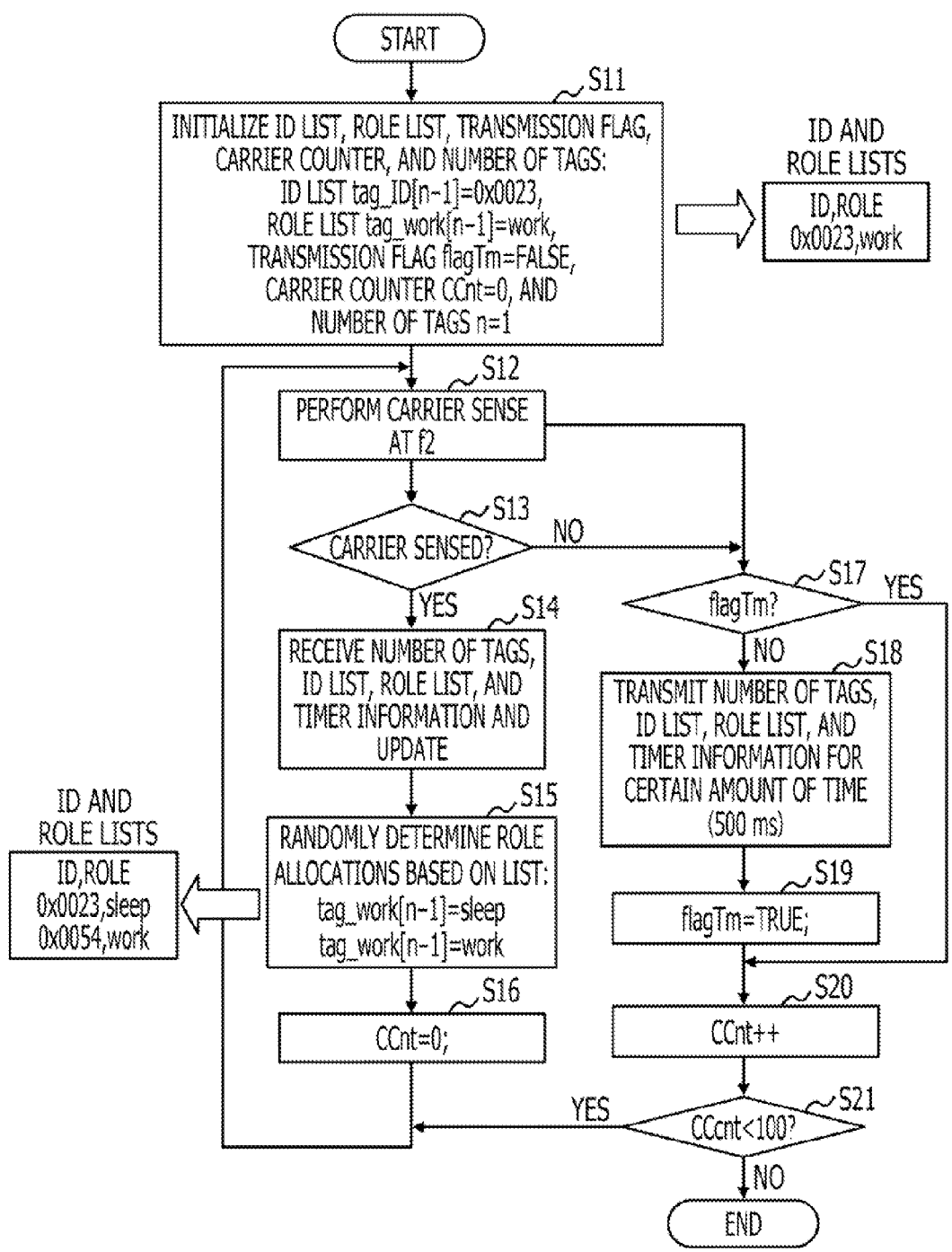
FIG. 6 is a flowchart illustrating the synchronization processing illustrated in FIG. 5.

FIG. 6 is a flowchart illustrating the synchronization processing in operation S2 illustrated in FIG. 5. In operation S11, the initialization processor 2134 in the synchronization processor 213 performs initialization processing for the synchronization processing. In the initialization processing, the ID list is initialized to tag_ID[n−1]=0×0023, the role list is initialized to tag_work[n−1]=work, the ID transmission flag flagTm is initialized to flagTm=FALSE, the carrier counter value CCnt is initialized to CCnt=0, and the number of other RFID tags 21A is initialized to n=1. In the role list, when the role is tag_work[n−1]=work, this indicates that the role of the RFID tag 21A is the representative, and when the role is tag_work[n−1]=sleep, this indicates that the role of the RFID tag 21A is sleep. When the ID transmission flag flagTm is flagTm=FALSE, this indicates that the tag ID of the local RFID tag 21A has not been transmitted to the other RFID tags 21A, and when the ID transmission flag flagTm=TRUE, this indicates that the tag ID of the local RFID tag 21A has been transmitted to the other RFID tags 21A. The tag ID "0×0023" in the ID list and the role "work" in the role list after the initialization are stored in the list storage unit 2132. In operation S12, the carrier-sense controller 217 performs carrier sense at the frequency f2 via the antenna 226 and the receiver 225. After operation S12, processing in operations S13 to S16 and processing in operations S17 to S21 are performed in parallel.

In operation S13, the carrier determiner 222 determines whether or not a carrier with the frequency f2 is sensed. When the result of the determination is YES, the process proceeds to operation S14. When the result of the determination is NO, the process proceeds to operation S17. In operation S14, on the basis of the received carrier, the reception processor 2138 receives the number "n" of other RFID tags 21A, the ID list, the role list, and timer information, stores the received pieces of information in the list storage unit 2132, and updates the information. In operation S15, the list creator 2131 randomly determines role allocations of the RFID tags 21A on the basis of the ID and role lists and stores the determined roles in the list storage unit 2132. For example, the determined role allocations tag_work[n−1]=sleep and tag_work[n]=work are stored in the list storage unit 2132. In operation S16, the synchronization-processing controller 2135 sets the carrier counter value CCnt to CCnt=0 and stores the carrier counter value CCnt in the carrier-counter holder 2136. Thereafter, the process returns to operation S12.

On the other hand, in operation S17, the synchronization-processing controller 2135 determines whether or not the ID transmission flag flagTm held in the ID-transmission-flag holder 2137 is TRUE indicating that the tag ID of the local RFID tag 21A has been transmitted to the other RFID tags 21A. When the result of the determination is YES, the process proceeds to operation S20. When the result of the determination is NO, the process proceeds to operation S18. In operation S18, the transmission-operation processor 214 transmits the number "n" of other RFID tags 21A, the ID list tag_ID, the role list tag_work, and the timer information via the data-for-tag generator 215, the transmitter 223, and the antenna 224 for a certain amount of time (e.g., 500 ms). In operation S19, the synchronization-processing controller 2135 sets the ID transmission flag flagTm to flagTm=TRUE. In operation S20, the synchronization-processing controller 2135 increments the carrier counter value CCnt, held by the carrier-counter holder 2136, by 1 to thereby update the carrier counter value CCnt to CCnt++ (or CCnt=CCnt+1). In operation S21, the synchronization-processing controller 2135 determines whether or not the carrier counter value CCnt held in the carrier-counter holder 2136 satisfies CCnt <100. When the result of the determination in operation S21 is YES, the process returns to operation S12, and when the result of the determination in operation S21 is NO, the processing ends.

Figure 7:
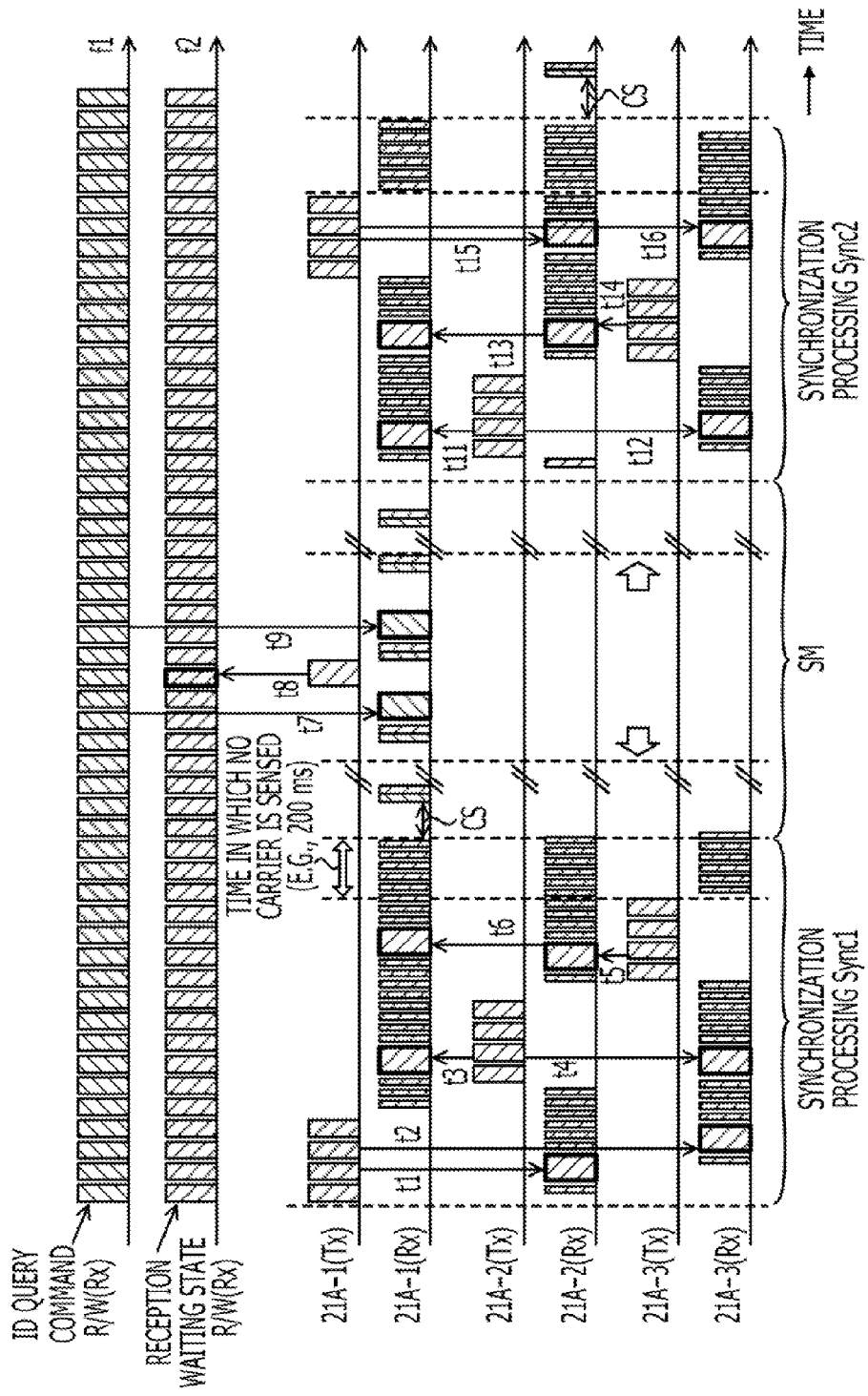
FIG. 7 is a timing chart illustrating exemplary operations, including the synchronization processing, of the RFID tags in the first embodiment.

FIG. 7 is a timing chart illustrating exemplary operations, including the synchronization processing, of the RFID tags in the first embodiment. In FIG. 7, R/W(Tx) indicates timings at which the R/W device 11 transmits, for example, an ID query command. R/W(Rx) indicates reception waiting timings (or reception waiting states) of the R/W device 11. Also, f1 indicates a transmission frequency and f2 indicates a reception frequency, where f1≠f2. Also, 21A-1(Tx) to 21A-3(Tx) indicate timings at which the RFID tags 21A-1 to 21A-3 transmit RF signals, respectively, and 21A-1(Rx) to 21A-3 (Rx) indicate reception timings of the RFID tags 21A-1 to 21A-3, respectively. The left-downward hatching indicates a carrier-sense period in which a signal, such as ID query command, from the R/W device 11 is detected. The right-downward hatching indicates a carrier-sense period in which a signal from the RFID tags 21A other than the local RFID tag 21A is detected. In periods denoted by thick, bold lines, the R/W device 11 and the RFID tags 21A-1 to 21A-3 perform reception processing for receiving information of the tag IDs and so on. In this example, for convenience of description, it is assumed that, during first synchronization processing Sync1, the role (or mode) of the RFID tag 21A-1 is the representative (or the transmission mode) and the roles (or modes) of the RFID tags 21A-2 and 21A-3 are the sleep (or the sleep modes). It is further assumed that, during next synchronization processing Sync2, the role of the RFID tag 21A-2 is the representative and the roles of the other RFID tags 21A-1 and 21A-3 are the sleep.

In the synchronization processing Sync1 in FIG. 7, at timings t1 and t2, the RFID tag 21A-1 whose role is the representative transmits information including the tag ID and the role of the RFID tag 21A-1 to the other RFID tags 21A-2 and 21A-3. At timings t3 and t4, the RFID tag 21A-2 whose role is sleep transmits information including the tag IDs and the roles of the RFID tags 21A-1 and 21A-2 to the other RFID tags 21A-1 and 21A-3. At timings t5 and t6, the RFID tag 21A-3 whose role is sleep transmits information including the tag IDs and the roles of the RFID tags 21A-1, 21A-2, and 21A-3 to the other RFID tags 21A-2 and 21A-1. CS indicates a predetermined amount of time (e.g., 500 ms) in which the representative RFID tag 21A-1 waits after the synchronization processing Sync1. SM indicates a predetermined period of time (e.g., 10 hours) in which the sleep RFID tags 21A-2 and 21A-3 wait in the sleep modes after the synchronization processing Sync1. After the predetermined amount of time CS, only the representative RFID tag 21A-1 periodically performs carrier sense. Thus, when the predetermined amount of time CS passes after the start of the predetermined period SM, the representative RFID tag 21A-1 periodically repeats a carrier-sense period (indicated by left-downward hatching in FIG. 7) for detecting a signal from the R/W device 11 and a carrier-sense period (indicated by right-downward hatching in FIG. 7) for detecting a signal from the RFID tags 21A-2 and 21A-3 other than the local RFID tag 21A-1. On the other hand, in the predetermined period SM, the sleep RFID tags 21A-2 and 21A-3 perform sleep operations and does not perform carrier sense, thus being in the power-saving mode.

In this example, at timing t7, the representative RFID tag 21A-1 receives the ID query command from the R/W device 11. At timing t8, the representative RFID tag 21A-1 transmits, to the R/W device 11 at a time, the tag ID of the representative RFID tag 21A-1 and the tag IDs of all other RFID tags 21A-2 and 21A-3 that can communicate with the representative RFID tag 21A-1. In this example, at timing t9, the representative RFID tag 21A-1 receives the ID query command from the R/W device 11.

In the synchronization processing Sync2 illustrated in FIG. 7, at timings t11 and t12, the representative RFID tag 21A-2 transmits information including the tag ID and the role of the RFID tag 21A-2 to the other RFID tags 21A-1 and 21A-3. At timings t13 and t14, the RFID tag 21A-3 whose role is sleep transmits information including the tag IDs and the roles of the RFID tags 21A-2 and 21A-3 to the other RFID tags 21A-1 and 21A-2. At timings t15 and t16, the RFID tag 21A-1 whose role is sleep transmits information including the tag IDs and the roles of the RFID tags 21A-1, 21A-2, and 21A-3 to the other RFID tags 21A-2 and 21A-3. After the synchronization processing Sync2, the representative RFID tag 21A-2 waits for a predetermined amount of time CS (e.g., for 500 ms). Although not illustrated in FIG. 7, the sleep RFID tags 21A-1 and 21A-3 wait in the sleep mode for a predetermined period SM (e.g., 10 hours) after the synchronization processing Sync2. After the predetermined amount of time CS, only the representative RFID tag 21A-2 periodically performs carrier sense. Thus, when the predetermined amount of time CS passes after the start of the predetermined period SM, the representative RFID tag 21A-2 has a carrier-sense period (as indicated by left-downward hatching in FIG. 7) for detecting a signal from the R/W device 11 and a carrier-sense period (as indicated by right-downward hatching in FIG. 7) for detecting a signal from the RFID tags 21A-1 and 21A-3 other than the local RFID tag 21A-2. On the other hand, in the predetermined period SM, the sleep RFID tags 21A-1 and 21A-3 perform sleep operations and do not perform carrier sense. Thereafter, the synchronization processing is periodically performed in the same manner as described above, and in a predetermined period after the synchronization processing, only the representative RFID tag 21A periodically performs carrier sense.

Figure 8:
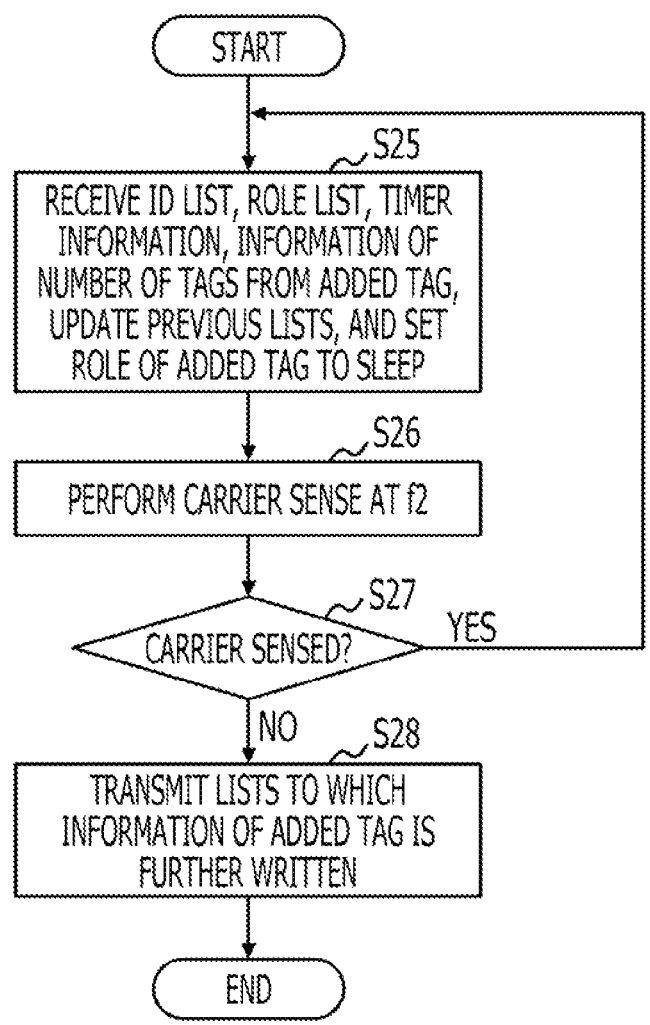
FIG. 8 is a flowchart illustrating the temporary synchronization processing illustrated in FIG. 5.

FIG. 8 is a flowchart illustrating the temporary synchronization processing illustrated in FIG. 5. In operation S25, the reception processor 2138 receives the ID list, the role list, the timer information, and the number "n" of other RFID tags from the added RFID tag 21A (e.g., the RFID tag 21A whose carrier was sensed in operation S7 in FIG. 5) via the antenna 226, the receiver 225, and the carrier determiner 222 and updates the contents of the list storage unit 2132. The role of the added RFID tag 21A is set to sleep.

In operation S26, the carrier-sense controller 217 performs carrier sense at the frequency f2. In operation S27, the carrier determiner 222 determines whether or not a carrier with the frequency f2 is sensed. When the result of the determination is YES, the process returns to operation S25. When the result of the determination is NO, the process proceeds to operation S28. In operation S28, the transmission-operation processor 214 transmits the ID and role lists to which the information of the added RFID tag 21A is added (or is further written) via the data-for-tag generator 215, the transmitter 223, and the antenna 224. Thereafter, the processing ends.

Figure 9:
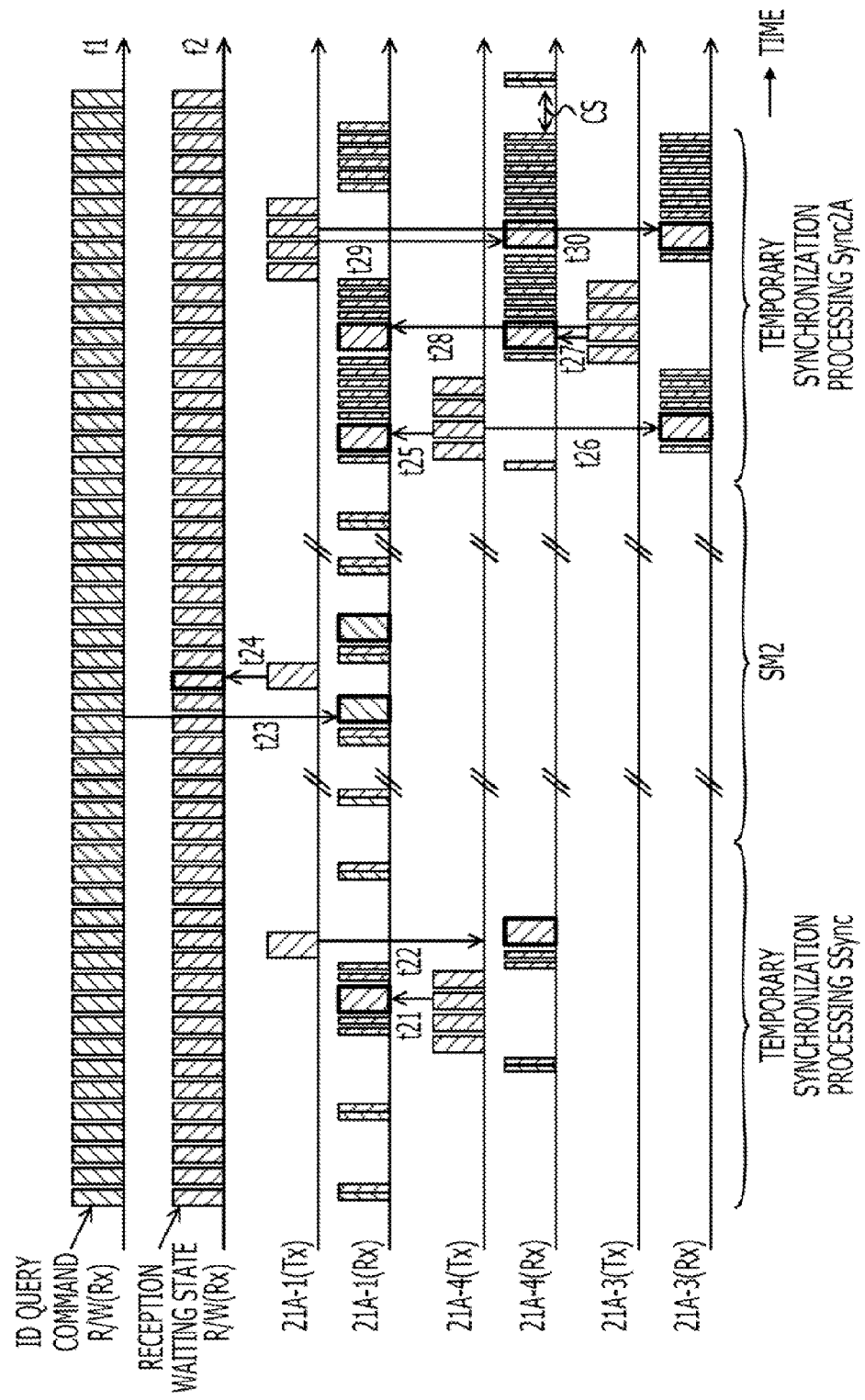
FIG. 9 is a timing chart illustrating exemplary operations, including the temporary synchronization processing, of the RFID tags in the first embodiment.

FIG. 9 is a timing chart illustrating exemplary operations, including the temporary synchronization processing, of the RFID tags in the first embodiment. In FIG. 9, substantially the same operations as those illustrated in FIG. 7 are denoted by the same reference characters and the descriptions thereof are omitted hereinafter. For convenience of description, FIG. 9 illustrates a case in which the RFID tag 21A-2 is removed from the information access system (or becomes unable to communication with the representative RFID tag 21A-1) and an RFID tag 21A-4 that can communicate with the representative RFID tag 21A-1 is newly added to the information access system. In FIG. 9, it is also assumed that, in the predetermined period SM after the synchronization processing Sync1 in FIG. 7, temporary synchronization processing SSync is performed and, during next synchronization processing Sync2 after a predetermined period SM2, the role of the RFID tag 21A-4 is the representative and the roles of the other RFID tags 21A-1 and 21A-3 are sleep.

In the temporary synchronization processing SSync in FIG. 9, at timing t21, the added RFID tag 21A-4 transmits information including the tag ID and the role of the RFID tag 21A-4 to the representative RFID tag 21A-1. As a result, the information of the RFID tag 21A-4 added in place of the removed RFID tag 21A-2 is stored in the representative RFID tag 21A-1. The information of the role transmitted from the RFID tag 21A-4 to the representative RFID tag 21A-1 at timing t21 has been set to, for example, the sleep. At timing t22, the RFID tag 21A-1 whose role is the representative transmits information including the tag IDs and the roles of the RFID tags 21A-1, 21A-3, and 21A-4 to the added RFID tags 21A-4. The role of the RFID tag 21A-4, the role being transmitted by the representative RFID tag 21A-1 at timing t22, has been determined to be the sleep by the representative RFID tag 21A-1.

In the predetermined period SM2 after the temporary synchronization processing SSync, at timing t23, the representative RFID tag 21A-1 receives the ID query command from the R/W device 11. At timing t24, the representative RFID tag 21A-1 transmits, to the R/W device 11 at a time, the tag ID of the representative RFID tag 21A-1 and the tag IDs of all other RFID tags 21A-3 and 21A-4 that can communicate with the representative RFID tag 21A-1. During the predetermined period SM2, the sleep RFID tags 21A-3 and 21A-4 perform sleep operations and do not perform carrier sense.

In synchronization processing Sync2A illustrated in FIG. 9, at timings t25 and t26, the RFID tag 21A-4 whose role is the representative transmits information including the tag ID and the role of the representative RFID tag 21A-4 to the other RFID tags 21A-1 and 21A-3. At timings t27 and t28, the RFID tag 21A-3 whose role is sleep transmits information including the tag IDs and the roles of the RFID tags 21A-3 and 21A-4 to the other RFID tags 21A-4 and 21A-1. At timings t29 and t30, the RFID tag 21A-1 whose role is sleep transmits information including the tag IDs and the roles of the RFID tags 21A-1, 21A-3, and 21A-4 to the other RFID tags 21A-4 and 21A-3. In the synchronization processing Sync2A, the information in the list storage units 2132 in the RFID tags 21A-1, 21A-3, and 21A-4 is updated to information including the updated tag IDs and roles including the information of the added RFID tag 21A-4. After the synchronization processing Sync2A, the representative RFID tag 21A-4 waits for a predetermined amount of time CS (e.g., for 500 ms).

Although not illustrated in FIG. 9, the sleep RFID tags 21A-1 and 21A-3 wait in the sleep mode for a predetermined period of time SM (e.g., 10 hours) after the synchronization processing Sync2A. After the predetermined amount of time CS, only the representative RFID tag 21A-4 periodically performs carrier sense. Thus, when the predetermined amount of time CS passes after the start of the predetermined period SM, the representative RFID tag 21A-4 has a carrier-sense period (as indicated by left-downward hatching in FIG. 9) for detecting a signal from the R/W device 11 and a carrier-sense period (as indicated by right-downward hatching in FIG. 9) for detecting a signal from the RFID tags 21A-1 and 21A-3 other than the local RFID tag 21A-4. On the other hand, in the predetermined period SM, the sleep RFID tags 21A-1 and 21A-3 perform sleep operations and do not perform carrier sense. Thereafter, the synchronization processing is periodically performed in the same manner as described above, and in a predetermined period after the synchronization processing, only the representative RFID tag 21A periodically performs carrier sense.

The temporary synchronization processing is performed as described above. Thus, even when an RFID tag other than the representative RFID tag is removed or added in the information access system, the representative RFID tag can centrally manage information of the other RFID tags that can communicate therewith.

(Second Embodiment)

Figure 10:
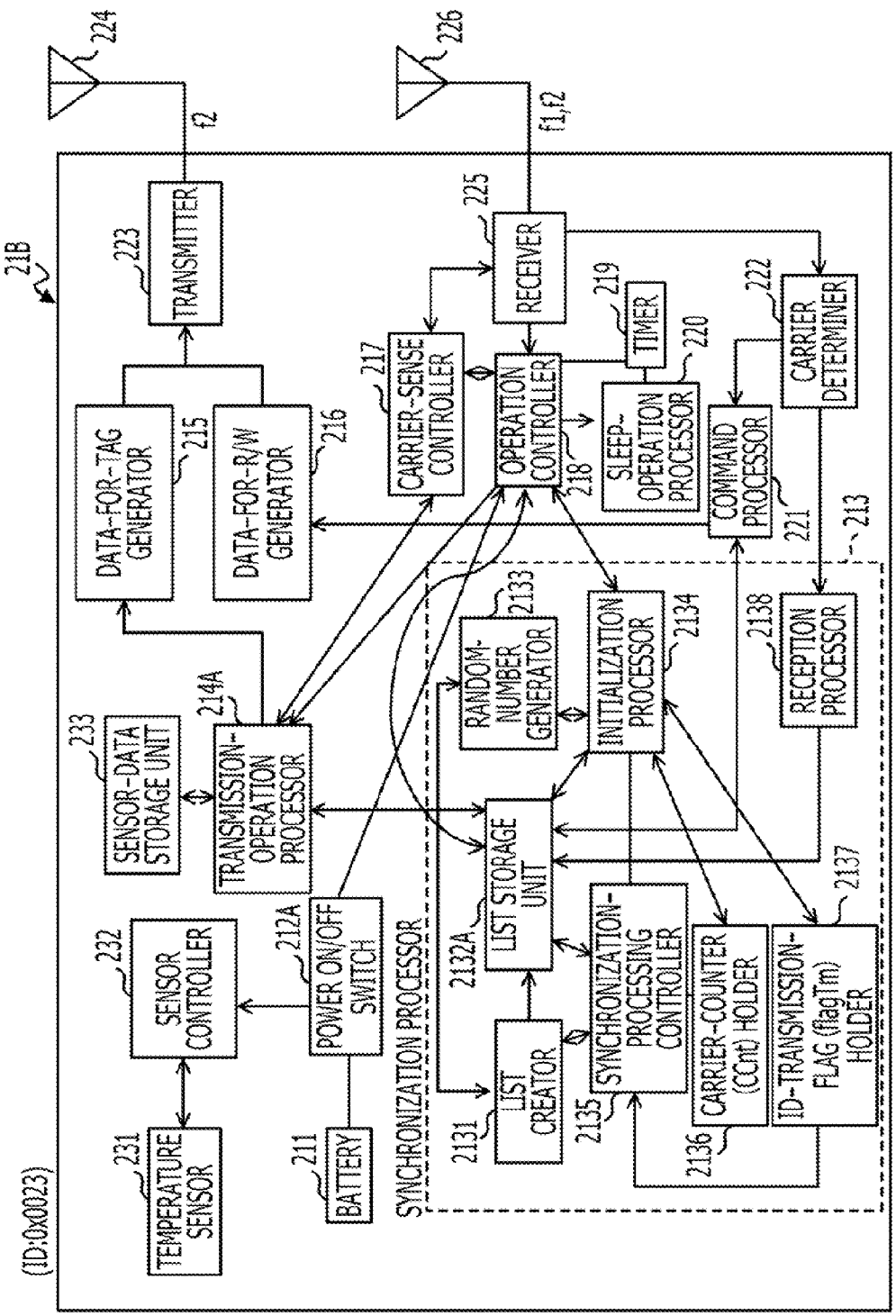
FIG. 10 is a block diagram illustrating an example of the configuration of an RFID tag in a second embodiment of the present invention.

FIG. 10 is a block diagram illustrating one example of the configuration of an RFID tag in a second embodiment of the present invention. In FIG. 10, substantially the same units as those illustrated in FIG. 4 are denoted by the same reference numerals and the descriptions thereof are omitted hereinafter.

As illustrated in FIG. 10, an RFID tag 21B in the present embodiment has a temperature sensor 231, a sensor controller 232, and a sensor-data storage unit 233. A power on/off switch 212A, a transmission-operation processor 214A, and a list storage unit 2132A perform operations that are partially different from those of the power on/off switch 212, the transmission-operation processor 214, and the list storage unit 2132 in the first embodiment described above.

The temperature sensor 231 senses an ambient temperature of the RFID tag 21B and outputs sensor data indicating the sensed temperature. When the power on/off switch 212A is turned on, the sensor controller 232 controls initialization of the temperature sensor 231. The sensor controller 232 may control the start and stop of the temperature sensor 231. The sensor-data storage unit 233 stores, as a sensor log, the sensor data in association with the tag ID of the RFID tag 21B and time information. On the basis of the sensor log stored in the sensor-data storage unit 233 and data stored in the list storage unit 2132A, the transmission-operation processor 214A controls transmission of data (e.g., an ID list containing identification information (such as a tag ID) for identifying the RFID tag 21B) to the R/W device 11 and transmission of data (e.g., an ID list or a role list containing roles) to the other RFID tags 21B during synchronization processing.

The temperature sensor 231 may also be replaced with a sensor for sensing an ambient parameter other than the ambient temperature of the RFID tag 21B. Examples of the alternative ambient parameter include humidity, light intensity, and sound volume. Since the RFID tag 21B can transmit the information, stored in the storage units 2132A and 233, to the R/W device 11, the R/W device 11 can also obtain various types of information, such as the ambient parameter, other than the tag ID of each RFID tag 21B in response to the ID query command.

Figure 11:
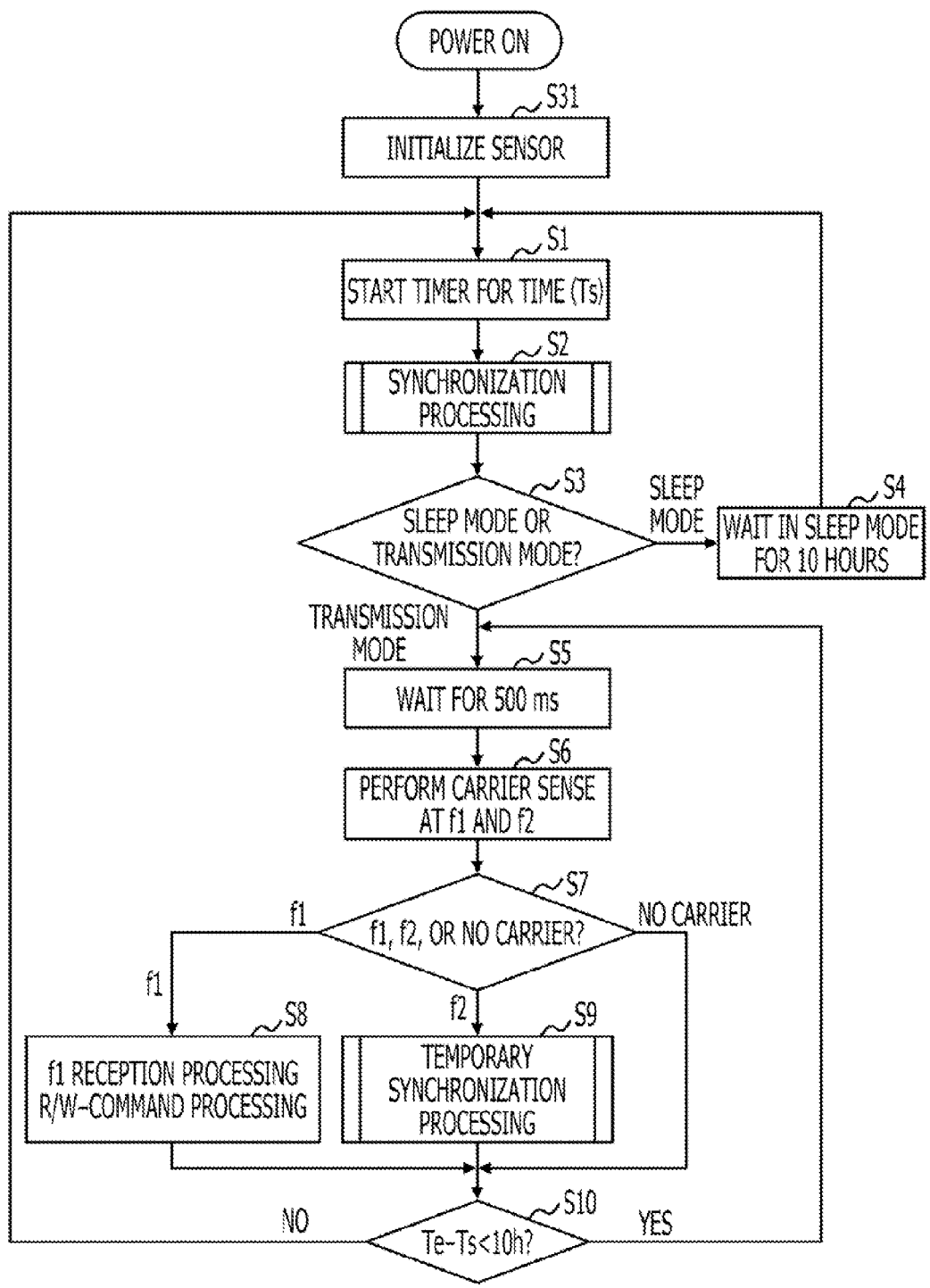
FIG. 11 is a flowchart illustrating exemplary operations of the RFID tag in the second embodiment.

FIG. 11 is a flowchart illustrating exemplary operations of one RFID tag in the second embodiment. In FIG. 11, substantially the same operations as those illustrated in FIG. 5 are denoted by the same reference characters and the descriptions thereof are omitted hereinafter.

The processing in FIG. 11 is started when the RFID tag 21B is powered on upon turning on of the power on/off switch 212A therefor. In this example, when the power on/off switch 212A is turned on, the sensor controller 232 starts the temperature sensor 231, and when the power on/off switch 212A is turned off, the sensor controller 232 stops the temperature sensor 231. In operation S31, the sensor controller 232 initializes the temperature sensor 231 and the process proceeds to operation S1. The operation in S1 and the subsequent operations are substantially the same as those in the first embodiment and the descriptions thereof are omitted hereinafter.

Figure 12:
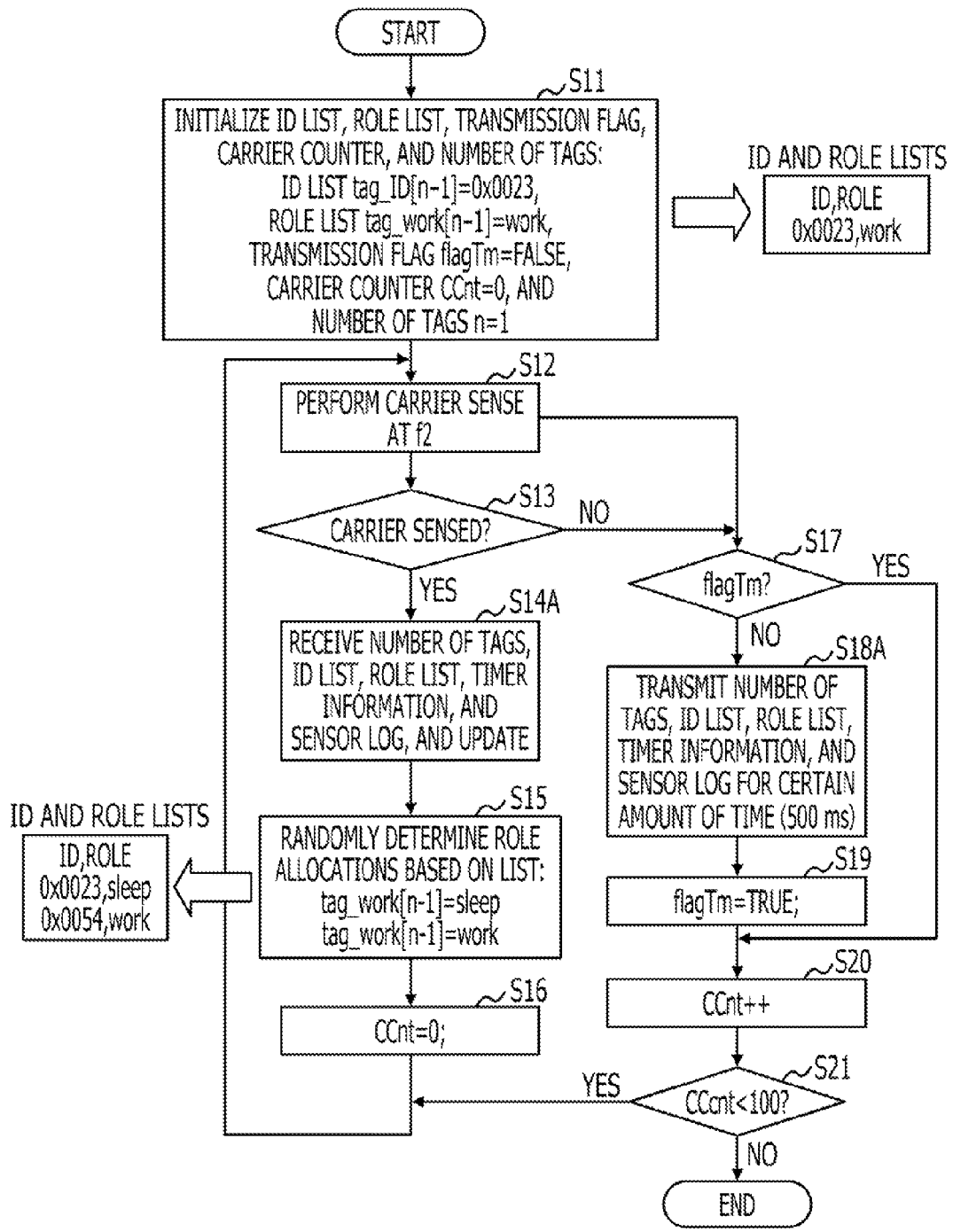
FIG. 12 is a flowchart illustrating the synchronization processing illustrated in FIG. 11.

FIG. 12 is a flowchart illustrating the synchronization processing illustrated in FIG. 11. In FIG. 12, substantially the same operations as those in FIG. 6 are denoted by the same reference characters and the descriptions thereof are omitted hereinafter.

In operation S11 in FIG. 12, tag ID "0×0023" in the initialized ID list and the role "work" in the initialized role list are stored in the list storage unit 2132A. In operation S14A, on the basis of the received carrier, the reception processor 2138 receives the number "n" of other RFID tags 21B, the ID list, the role list, the timer information, and the sensor log, stores the received pieces of information in the list storage unit 2132A, and updates the information. In operation S18A, the transmission-operation processor 214A transmits the number "n" of other RFID tags 21B, the ID list tag_ID, the role list tag_work, the timer information, and the sensor log via the data-for-tag generator 215, the transmitter 223, and the antenna 224 for a certain amount of time (e.g., 500 ms).

Since a timing chart illustrating exemplary operations, including the synchronization processing, of the RFID tags in the second embodiment is substantially the same as the timing chart in FIG. 7, the illustration and description thereof are omitted.

Since a flowchart illustrating the temporary synchronization processing in the second embodiment is substantially the same as the flowchart in FIG. 8, the illustration and description thereof are omitted.

In addition, since a timing chart illustrating exemplary operations, including the temporary synchronization processing, of the RFID tags in the second embodiment is substantially the same as the timing chart in FIG. 9, the illustration and the description thereof are omitted.

(Third Embodiment)

Figure 13:
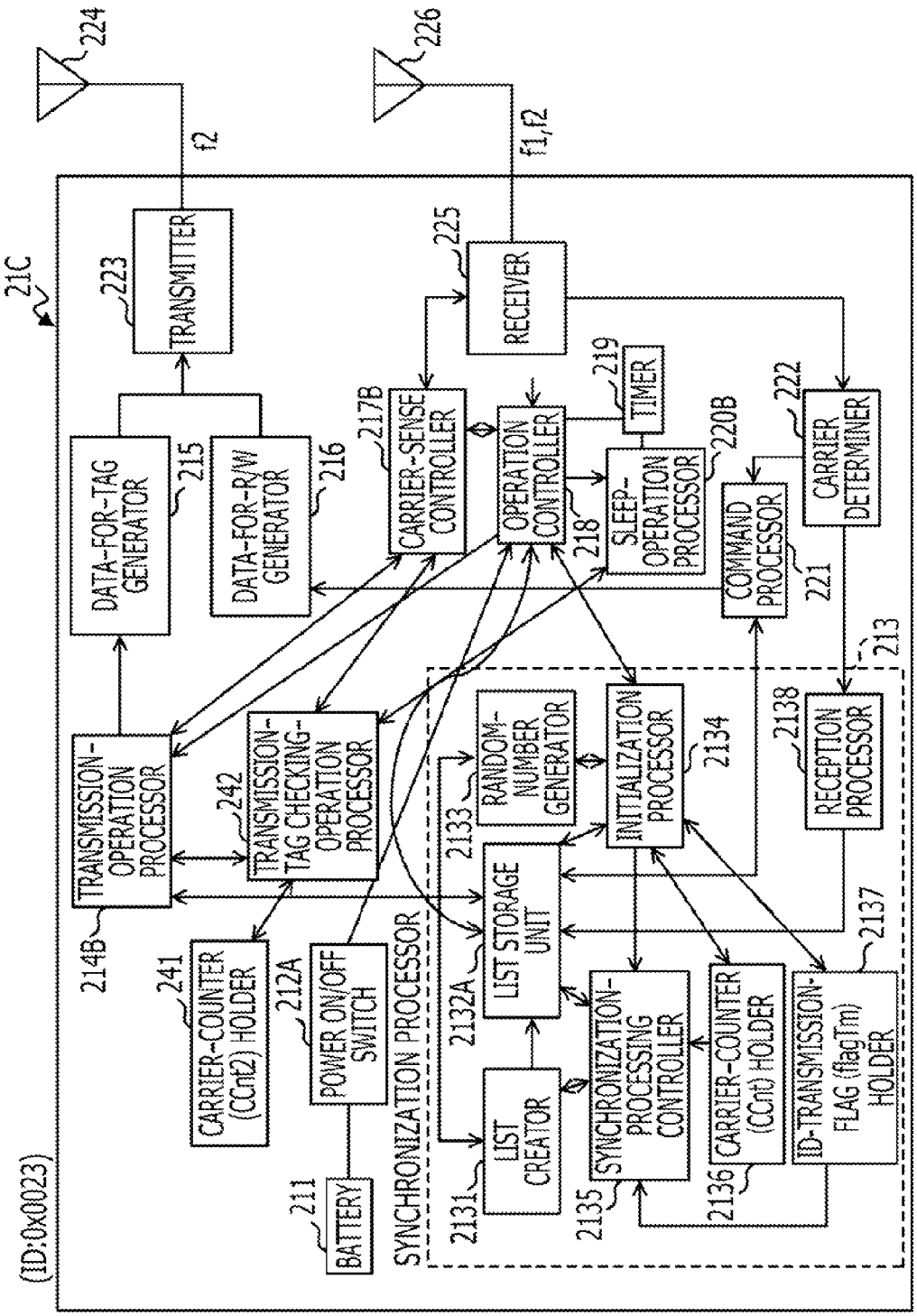
FIG. 13 is a block diagram illustrating an example of the configuration of an RFID tag in a third embodiment of the present invention.

FIG. 13 is a block diagram illustrating one example of the configuration of an RFID tag in a third embodiment of the present invention. In FIG. 13, substantially the same units as those illustrated in FIG. 4 are denoted by the same reference numerals and the descriptions thereof are omitted hereinafter.

As illustrated in FIG. 13, an RFID tag 21C in the present embodiment includes a carrier-counter holder 241 and a transmission-tag checking-operation processor 242. A transmission-operation processor 214B, a carrier-sense controller 217B, and a sleep-operation processor 220B perform operations that are partially different from those of the transmission-operation processor 214, the carrier-sense controller 217, and the sleep-operation processor 220 of the first embodiment.

The carrier-counter holder 241 counts a condition for ending the transmission-tag checking operation for checking the ID transmission flag flagTm (e.g., counts the number of carrier senses) and holds a resulting carrier count value CCnt2. The transmission-tag checking-operation processor 242 checks whether or not another RFID tag 21C that can communicate with the local RFID tag 21C and that is in the transmission mode, e.g., a transmission tag, is present in the vicinity of the local RFID tag 21C.

Figure 14:
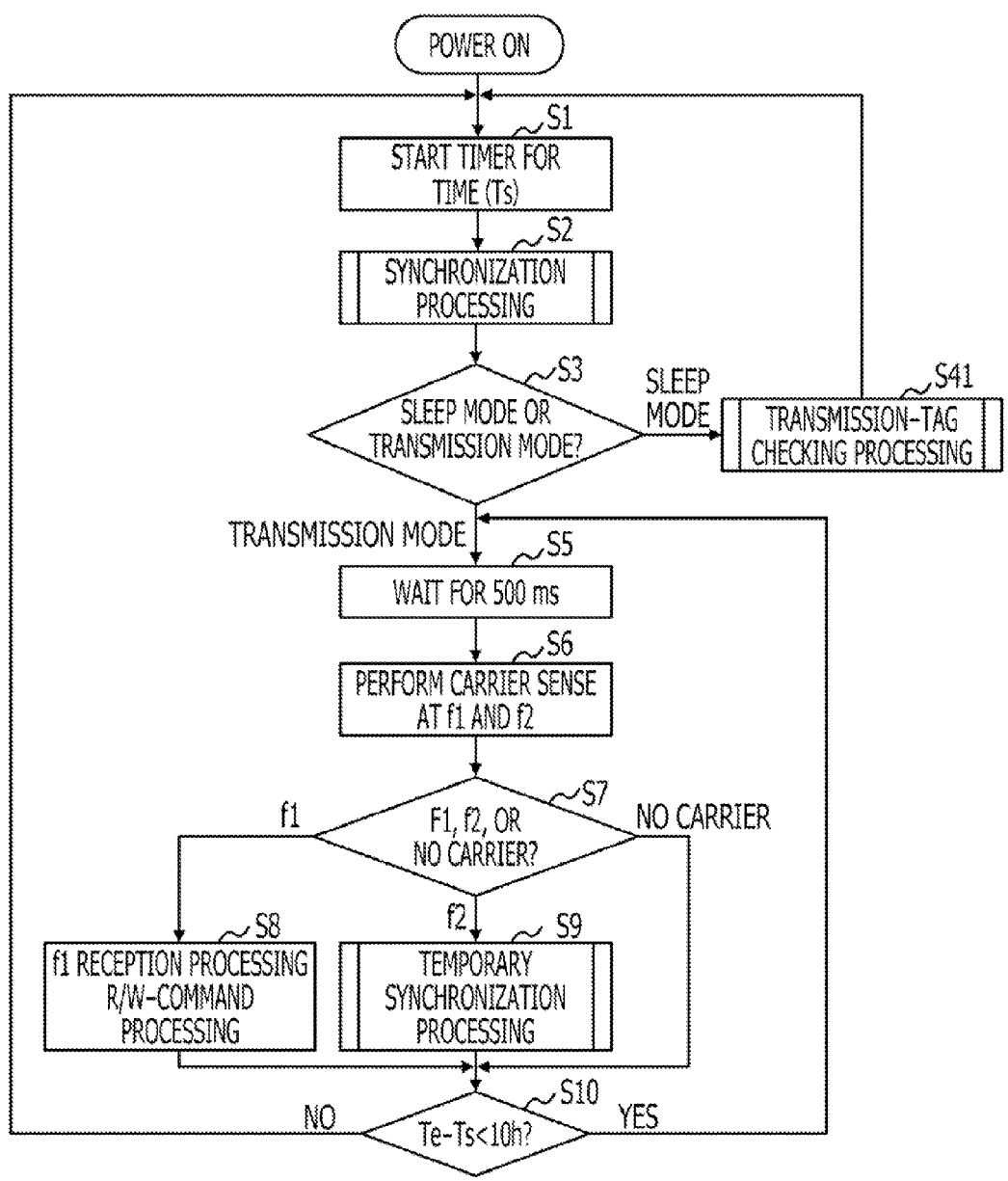
FIG. 14 is a flowchart illustrating exemplary operations of the RFID tag in the third embodiment.

FIG. 14 is a flowchart illustrating exemplary operations of one RFID tag in the third embodiment. In FIG. 14, substantially the same operations as those illustrated in FIG. 5 are denoted by the same reference characters and the descriptions thereof are omitted hereinafter.

In FIG. 14, when the result of the determination in operation S3 indicates that the operation mode of the RFID tag 21C is the sleep mode, the process proceeds to operation S41 in which the sleep-operation processor 220B performs transmission-tag checking processing for transmitting a check signal for checking the presence of a transmission tag (described below). Thereafter, the process returns to operation S1.

Since a flowchart illustrating the synchronization processing in the third embodiment is substantially the same as the flowchart of FIG. 6, the illustration and description thereof are omitted.

Since a timing chart illustrating exemplary operations, including the synchronization processing, of the RFID tags in the third embodiment is substantially the same as the timing chart of FIG. 7, the illustration and description thereof are omitted.

Since a flowchart illustrating the temporary synchronization processing in the third embodiment is substantially the same as the flowchart of FIG. 8, the illustration and description thereof are omitted.

In addition, since a timing chart illustrating exemplary operations, including the temporary synchronization processing, of the RFID tags in the third embodiment is substantially the same as the timing chart of FIG. 9, the illustration and the description thereof are omitted.

Figure 15:
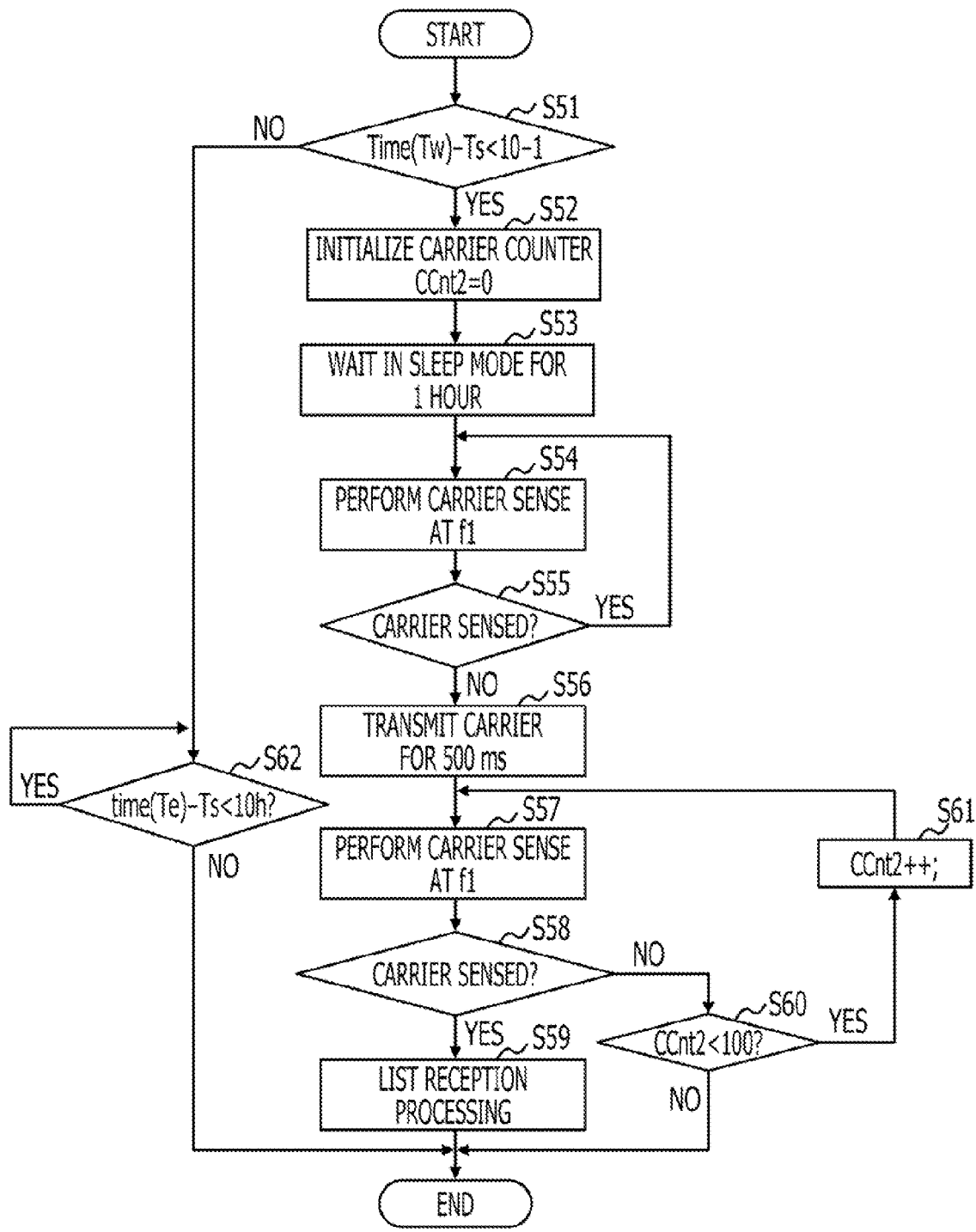
FIG. 15 is a flowchart illustrating the transmission-tag checking processing illustrated in FIG. 14.

FIG. 15 is a flowchart illustrating the transmission-tag checking processing illustrated in FIG. 14. In operation S51, the operation controller 218 determines whether or not a difference obtained by subtracting the time Ts managed by the timer 219 from a preset time Tw is less than a predetermined period (e.g., 10−1=9 hours), e.g., determines whether or not Tw−Ts<9 h is satisfied. When the result of the determination in operation S51 is YES, the process proceeds to operation S52. When the result of the determination is NO, the process proceeds to operation S62. In operation S52, the transmission-tag checking-operation processor 242 initializes the carrier counter value CCnt2 in the carrier-counter holder 241 to CCnt2=0. In operation S53, the sleep-operation processor 220B causes the RFID tag 21C to wait in the sleep mode for a certain amount of time (e.g., one hour). After the waiting, the process proceeds to operation S54.

In operation S54, the carrier-sense controller 217B performs carrier sense at the frequency f1 via the antenna 226 and the receiver 225. In operation S55, the carrier determiner 222 determines whether or not a carrier with the frequency f1 is sensed by the carrier sense. When the result of the determination in operation S55 is YES, the process returns to operation S54. On the other hand, when the result of the determination in operation S55 is NO, the process proceeds to operation S56 in which the transmission-operation processor 214B transmits a carrier with the frequency f2 via the data-for-tag generator 215, the transmitter 223, and the antenna 224 for a certain amount of time (e.g., 500 ms).

In operation S57, the carrier-sense controller 217B performs carrier sense at the frequency f1 via the antenna 226 and the receiver 225. In operation S58, the carrier determiner 222 determines whether or not a carrier with the frequency f1 is sensed by the carrier sense. When the result of the determination in operation S58 is YES, the process proceeds to operation S59, and when the result of the determination in operation S58 is NO, the process proceeds to operation S60. In operation S59, on the basis of the received carrier, the reception processor 213B receives the number "n" of other RFID tags 21C, the ID list, the role list, and the timer information, stores the received pieces of information in the list storage unit 2132A, and updates the information. Thereafter, the processing ends.

On the other hand, in operation S60, the transmission-tag checking-operation processor 242 determines whether or not the carrier counter value CCnt2 held by the carrier-counter holder 241 is less than a specified value (e.g., 100). When the result of the determination is NO, the processing ends. On the other hand, when the result of the determination in operation S60 is YES, the process proceeds to operation S61 in which the transmission-tag checking-operation processor 242 updates the carrier counter value CCnt2 held by the carrier-counter holder 241 to CCnt2++ (or CCnt2=CCnt2+1). Thereafter, the process returns to operation S57.

When the result of the determination in operation S51 is NO, the process proceeds to operation S62 in which the transmission-tag checking-operation processor 242 determines whether or not a difference obtained by subtracting the time Ts managed by the timer 219 from a preset time Te is less than a predetermined period (e.g., 10 hours), e.g., determines whether or not Te−Ts<10 h is satisfied. The processing in operation S62 is repeated until the result of the determination in operation S62 becomes NO. When the result of the determination in operation S62 becomes NO, the processing ends.

Figure 16:
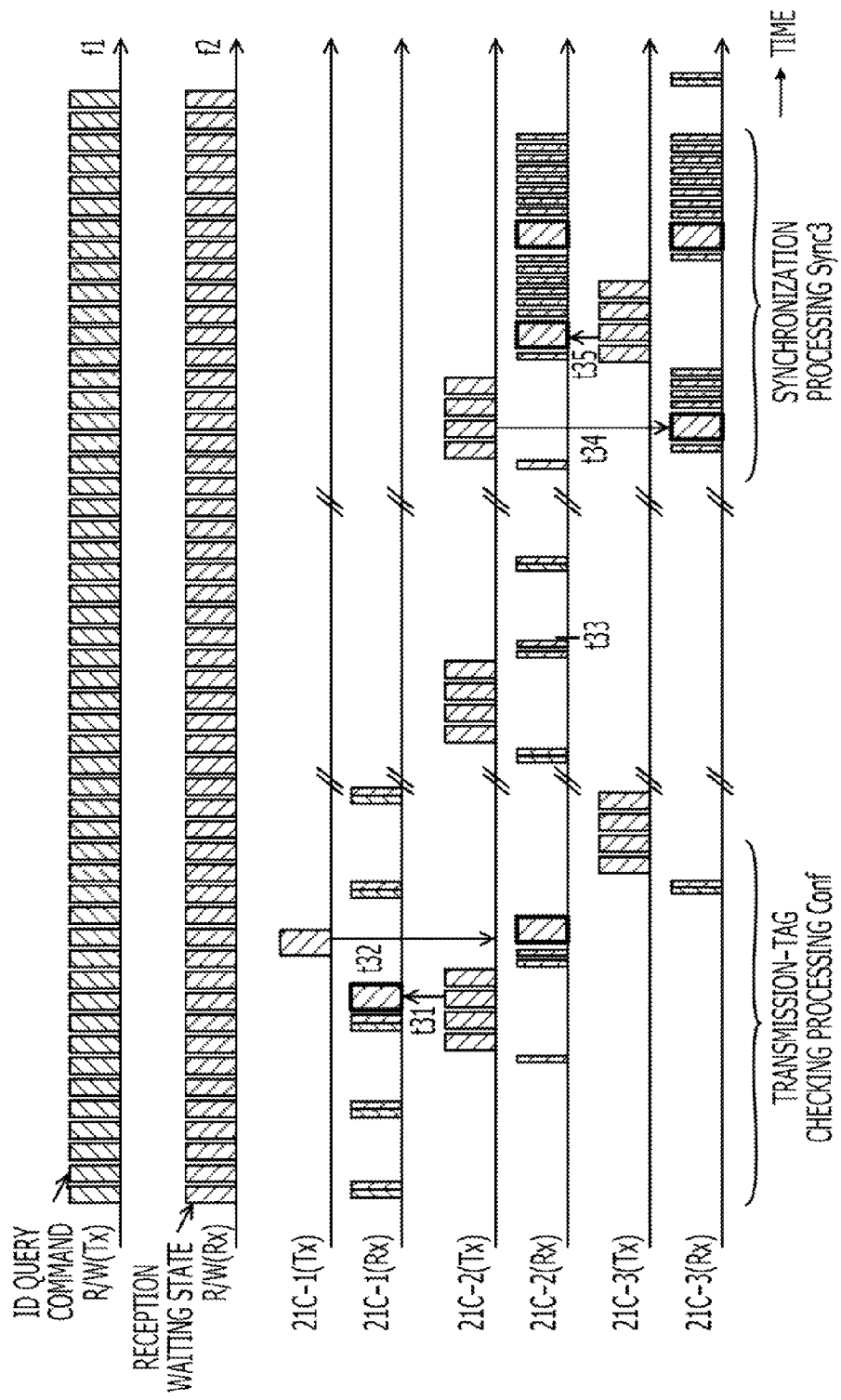
FIG. 16 is a timing chart illustrating exemplary operations, including the transmission-tag checking processing, of the RFID tags in the third embodiment.

FIG. 16 is a timing chart illustrating exemplary operations, including the transmission-tag checking processing, of the RFID tags in the third embodiment. In FIG. 16, substantially the same operations as those illustrated in FIGS. 7 and 9 are denoted by the same reference characters and the descriptions thereof are omitted hereinafter. FIG. 16 illustrates an example in which, after the synchronization processing is performed when the representative RFID tag 21C-1 is a transmission tag and the RFID tags 21C-2 and 21C-3 are in the sleep mode, the RFID tags 21C-2 and 21C-3 transmit check signals for checking the presence of a transmission tag periodically (e.g., at intervals of one hour). In this example, when the RFID tag 21C-1 becomes unable to communicate with the other RFID tags 21C-2 and 21C-3 in the middle of communication and a response to the check signal cannot be received from the RFID tag 21C-1, the RFID tag 21C-2 becomes a transmission tag by itself.

In FIG. 16, after the synchronization processing is performed when the representative RFID tag 21C-1 is a transmission tag and the RFID tag 21C-2 and 21C-3 are in the sleep mode, transmission-tag checking processing Conf is performed. In the transmission-tag checking processing Conf, the RFID tags 21C-2 and 21C-3 transmit check signals for checking the presence of a transmission tag periodically (e.g., at intervals of one hour). In FIG. 16, at timing t31, the RFID tag 21C-2 transmits a check signal to the RFID tag 21C-1 that is a transmission tag, and at timing t32, the RFID tag 21C-1 transmits information including the tag IDs and the roles of the RFID tags 21A-1, 21A-2, and 21A-3 to the other RFID tags 21A-2 and 21A-3.

In this example, since the RFID tag 21C-1 becomes unable to communicate with the other RFID tags 21C-2 and 21C-3 in the middle of communication and a response to the check signal cannot be received from the RFID tag 21C-1, for example, the RFID tag 21C-2 becomes a transmission tag by itself at timing t33 at which the RFID tag 21C-2 becomes unable to obtain a response from the RFID tag 21C-1. Thereafter, in synchronization processing Sync3, at timing t34, the RFID tag 21C-2 that has newly become the transmission tag transmits information including its own tag ID and role to the other RFID tag 21C-3 that can communicate with the RFID tag 21C-2. At timing t35, the RFID tag 21C-3 also transmits information including the tag IDs and the roles of the RFID tag 21C-2 and 21C-3 to the RFID tag 21C-2 that is the transmission tag.

The transmission-tag checking processing is performed as described below. Thus, even when a transmission tag in an information access system becomes unable to communicate with other RFID tags, an arbitrary RFID tag that can communicate with the other RFID tags serves as a transmission tag. With this arrangement, even when any RFID tag becomes a representative RFID tag in subsequent synchronization processing, the representative RFID tag can centrally manage the information of the other RFID tags that can communicate therewith.

(Modifications)

Figure 17:
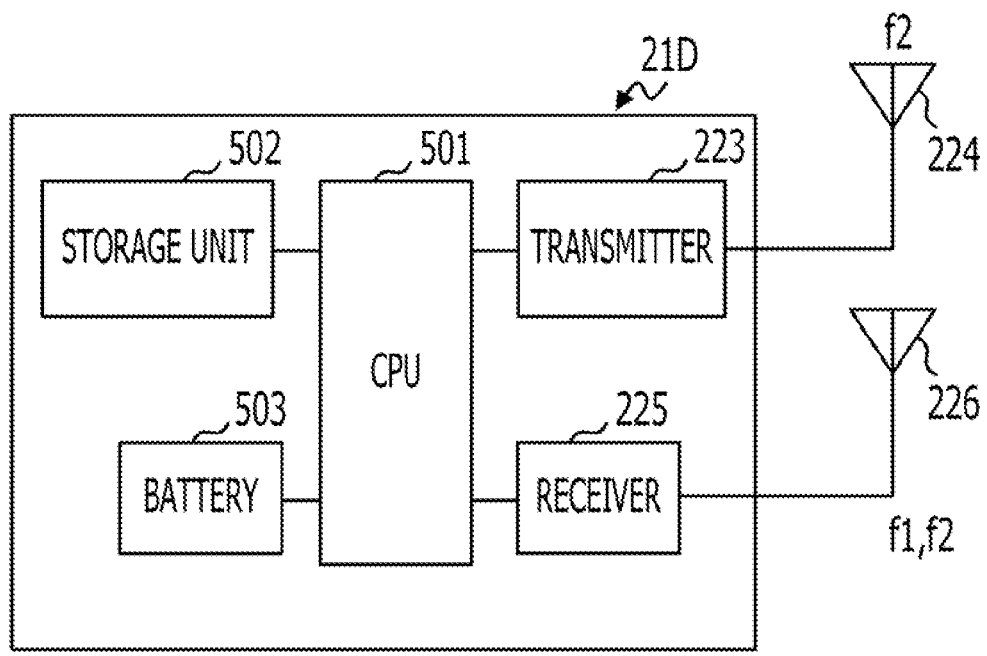
FIG. 17 is a block diagram illustrating another example of the configuration of the RFID tag.

FIG. 17 is a block diagram illustrating another example of the configuration of the RFID tag. An RFID tag 21D illustrated in FIG. 17 includes a CPU (central processing unit) 501, a storage unit 502, a battery 503, and a transmitter 223, a receiver 225, and antennas 224 and 226. The CPU 501 is one example of the processor or the controller. The storage unit 502 stores a program executed by the CPU 501 and various data including intermediate data of computation executed by the CPU 501. Various data stored in the storage unit 502 may include parameters, such as the data stored in the storage units 2132 and 2132A, the counter value held by the carrier-counter holder 2136, the flag held by the ID-transmission-flag holder 2137, and the predetermined period, the predetermined amount of time, and the certain amount of time described above in conjunction with the flowcharts. The battery 503 supplies power to the individual units in the RFID tag 21D including the CPU 501. The transmitter 223, the receiver 225, and the antennas 224 and 226 constitute one example of a transmitter/receiver that enables communication with the R/W device and other RFID tags.

The storage unit 502 is one example of a computer-readable storage medium. Examples of the computer-readable storage medium include a magnetic recording medium, an optical recording medium, a magneto-optical recording medium, a disk device using a disk as a recording medium, and a semiconductor storage device including a ROM (read only memory). One example of the disk device using a disk as a recording medium is a HDD (hard disk drive). The storage unit 502 may be constituted by multiple storage devices. In such a case, the storage unit 502 may have, for example, a RAM (random access memory) and a ROM or may include storage devices having different access speeds.

The program stored in the storage unit 502 may cause the CPU 501 to execute a procedure for the processing performed by any of the RFID tags 21A to 21C in the first to third embodiments described above and may also cause the CPU 501 to realize the functions of the individual units (i.e., the functional blocks) in any of the RFID tags 21A to 21C in the first to third embodiments described above.

The function of the timer 219 may be implemented by, instead of the CPU 501, a configuration in which another timer for achieving the function of the timer 219 is coupled to the CPU 501.

(Conclusion)

According to active RFID tags of the related art, since each RFID tag transmits/receives data independently from other RFID tags, many unwanted intermittent operations (e.g., carrier senses) are performed and a relatively large amount of power is also consumed. By contrast, in any of the first to third embodiments described above, since the number of RFID tags that perform the intermittent operations (e.g., the carrier senses) can be minimized, the power consumption can be substantially reduced. When n RFID tags that can communicate with an arbitrary RFID tag exists in its vicinity, the power consumed by each RFID tag in each embodiment described above can be reduced to about 1/n compared to the case of the related art, though, depending on the synchronization processing.

When the R/W device and multiple RFID tags transmit/receive data, radio waves transmitted by the RFID tags in each embodiment described above are less likely to collide with each other. Thus, it is possible to perform smooth communication. Since the tag IDs, the sensor logs, and so on are exchanged between the RFID tags in advance, the R/W device can reliably obtain the data of each RFID without data loss compared to the case of the related art.

Energy consumed by one exemplary active RFID tag of the related art and energy consumed by the active RFID tag of each embodiment described above can be determined in the following manner. In this case, T indicates elapsed time, N is the number of RFID tags in the information access system, $D_{CT}$ indicates the carrier sense intervals of each RFID tag, $S_T$ is a synchronization time in which the synchronization processing in each embodiment described above is performed, $S_N = T/S_T$ is the number of synchronization operations, $E_S$ is energy consumed by each RFID tag during the synchronization processing, $C_T = T/86400$, $1(h) = 86400$ (s (seconds)) indicates transmission frequency of each RFID tag (e.g., once a day), and $C_R = T/86400$, $1(h) = 86400$ (s (seconds)) indicates reception frequency of each RFID tag (e.g., once a day). $E_X$ indicates energy that can be saved by each RFID tag when it does not sense a carrier with the frequency f1 from the R/W device during the synchronization processing. Also, $dt_C$ indicates the amount of time for each carrier sense performed by each RFID tag, $\alpha$ indicates power consumed by each RFID tag during the carrier sense, $dt_T$ indicates the amount of time for each transmission of each RFID tag, $\beta$ indicates power consumed by each RFID tag during the transmission, $\gamma$ indicates the amount of time for each reception of each RFID tag, and $dt_R$ indicates power consumed by each RFID tag during the reception.

For the example of the active RFID tags of the related art wherein each RFID tag operates independently from the other RFID tags, the energy $E_{normal}$ consumed by one RFID tag can be expressed by:

$$E_{normal} = 2T/D_{CT} \times \alpha dt_C + \beta dt_T C_T + \gamma dt_R C_R$$
$$= \{2\alpha dt_C / D_{CT} + (\beta dt_T + \gamma dt_R)/86400\}T$$
$$= P_{normal} T$$

On the other hand, energy $E_{sync}$ consumed by one RFID tag when it performs synchronization processing as in each embodiment described above can be expressed by:

$$E_{sync} = 2T/ND_{CT} \times \alpha dt_C + S_N \times (E_S - E_X) + \beta dt_T C_T + \gamma dt_R C_R$$
$$= [\{2\alpha dt_C / D_{CT} + (\beta dt_T + \gamma dt_R)/86400\}/N + \{E_S - E_X\}/S_T]T$$
$$= \{P_{normal}/N + (E_S - E_X)/S_T\}T$$

As can be understood from comparison between the energy consumptions $E_{normal}$ and $E_{sync}$, the energy consumed by the RFID tags in each embodiment described above can be reduced compared to the energy consumed by the example of the active RFID tags of the related art wherein each RFID tag operates independently from the other RFID tags.

When the R/W device writes write data to one RFID tag, the R/W device may write, to the representative RFID tag, the write data together with the tag ID of the RFID tag to which the write data is to be written. In such a case, when the representative RFID tag transmits the information of the tag IDs and the roles to the other sleep RFID tags during next synchronization processing, the representative RFID tag may transmit the write data and the tag ID of the RFID tag to which the write data is written. The RFID tag to which the write data is written may store the received write data in the storage unit in the RFID tag, when its own ID tag matches the tag ID received from the representative RFID tag.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An active contactless information storage device having a battery therein, the device comprising:
   an operation controller that determines whether mode information of the active contactless information storage device indicates a mode in which the active contactless information storage device communicates with a reader/writer device , by referring to a storage unit in which the mode information is stored;
   a carrier-sense controller that determines whether a first signal having a first frequency used for communication with the reader/writer device is sensed in a first period and determines whether a second signal having a second frequency used for communication with other active contactless information storage devices is sensed in the second period, when the mode information of the active contactless information storage device indicates the mode in which the active contactless information storage device communicates with the reader/writer device; and
   a command processor that performs communication with the reader/writer device when the carrier sense controller determines that the first signal having the first frequency is sensed;
   wherein, when the mode information of the active contactless information storage device does not indicate the mode in which the active contactless information storage device communicates with the reader/writer device, the carrier-sense controller waits for a predetermined amount of time, wherein when the mode information of the active contactless information storage device does not indicate the mode in which the active contactless information storage device communicates with the reader/writer device, the carrier-sense controller determines whether the first signal having the first frequency is sensed;

when the carrier-sense controller determines that the first signal having the first frequency is not sensed, a transmission-operation processor transmits the second signal having the second frequency for a certain amount of time; and after the transmission-operation processor transmits the second signal having the second frequency, the carrier-sense controller determines whether the first signal having the first frequency is sensed, and when the first signal having the first frequency is sensed, the carrier-sense controller obtains identification information and mode information of the other active contactless information storage devices at the sensed first frequency and stores the identification information and the mode information in the storage unit.

2. The active contactless information storage device according to claim 1, wherein each time a predetermined amount of time passes, the carrier-sense controller determines whether the second signal having the second frequency used for communication with the other active contactless information storage devices is sensed;

when the carrier-sense controller determines that the second signal having the second frequency is sensed, the reception processor obtains identification information and mode information of the other active contactless information storage devices at the sensed second frequency and stores the identification information and the mode information in the storage unit;

a list creator determines mode information of each active contactless information storage device, mode information includes at least one mode in which the active contactless information storage device communicates with a reader/writer device and stores the determined mode information in the storage unit; and when the carrier-sense controller determines that the second signal having the second frequency is not detected, a transmission-operation processor transmits the identification information and the mode information of the other active contactless information storage devices via an antenna for a certain amount of time, the identification information and the mode information being stored in the storage unit.

3. An information access system comprising:
a reader/writer device including,
a transmitter that transmits a first signal having a first frequency, and
a receiver that receives a second signal having a second frequency; and
active contactless information storage devices, each including,
an operation controller that determines whether mode information of the active contactless information storage device indicates a mode in which the active contactless information storage device communicates with the reader/writer device, by referring to a storage unit in which the mode information is stored;

a carrier-sense controller that determines whether the first signal having the first frequency used for communication with the reader/writer device is sensed in a first period and determines whether the second signal having the second frequency used for communication with the other active contactless information storage devices is sensed in the second period, when the mode information of the active contactless information storage device indicates the mode in which the active contactless information storage device communicates with the reader/writer device; and a command processor that performs communication with the reader/writer device when the carrier sense controller determines that the first signal having the first frequency is sensed;

wherein, when the mode information of the active contactless information storage device does not indicate the mode in which the active contactless information storage device communicates with the reader/writer device, the carrier-sense controller waits for a predetermined amount of time, wherein when the mode information of the active contactless information storage device does not indicate the mode in which the active contactless information storage device communicates with the reader/writer device, the carrier-sense controller determines whether the first signal having the first frequency is sensed;

when the carrier-sense controller determines that the first signal having the first frequency is not sensed, a transmission-operation processor transmits the second signal having the second frequency for a certain amount of time; and after the transmission-operation processor transmits the second signal having the second frequency, the carrier-sense controller determines whether the first signal having the first frequency is sensed, and when the first signal having the first frequency is sensed, the carrier-sense controller obtains identification information and mode information of the other active contactless information storage devices at the sensed first frequency and stores the identification information and the mode information in the storage unit.

4. An active contactless information storage device communication method, the method comprising:
determining, by an operation controller, whether mode information of the active contactless information storage device indicates a mode in which the active contactless information storage device communicates with a reader/writer device, by referring to a storage unit in which the mode information is stored;

determining, by a carrier-sense controller, whether a first signal having a first frequency used for communication with the reader/writer device is sensed in a first period and determining whether a second signal having a second frequency used for communication with other active contactless information storage devices is sensed in the second period, when the mode information of the active contactless information storage device indicates the mode in which the active contactless information storage device communicates with the reader/writer device;

performing communication, by a command processor, with the reader/writer device when the carrier sense controller determines that the first signal having the first frequency is sensed;

wherein, when the mode information of the active contactless information storage device does not indicate the mode in which the active contactless information storage device communicates with the reader/writer device, the carrier-sense controller waits for a predetermined amount of time;

determining, by the carrier-sense controller, whether the first signal having the first frequency is sensed when the mode information of the active contactless information storage device does not indicate the mode in which the active contactless information storage device communicates with the reader/writer device;

transmitting, by a transmission-operation processor, the second signal having the second frequency for a certain amount of time when the carrier-sense controller determines that the first signal having the first frequency is not sensed; and determining, by the carrier-sense controller, after the transmission-operation processor transmits the second signal having the second frequency, whether the first signal having the first frequency is sensed, and when the first signal having the first frequency is sensed, obtaining, by the carrier-sense controller, identification information and mode information of the other active contactless information storage devices at the sensed first frequency and storing the identification information and the mode information in the storage unit.

5. The active contactless information storage device communication method according to claim 4, the method further comprising:

determining, by the carrier-sense controller, whether the second signal having the second frequency used for communication with the other active contactless information storage devices is sensed each time a predetermined amount of time passes;

obtaining identification information and mode information, by the reception processor, of the other active contactless information storage devices at the sensed second frequency and storing the identification information and the mode information in the storage unit when the carrier-sense controller determines that the second signal having the second frequency is sensed;

determining mode information, by a list creator, of each active contactless information storage device, mode information includes at least one mode in which the active contactless information storage device communicates with a reader/writer device and storing the determined mode information in the storage unit; and transmitting, by a transmission-operation processor, the identification information and the mode information of the other active contactless information storage devices via an antenna for a certain amount of time, the identification information and the mode information being stored in the storage unit, when the carrier-sense controller determines that the second signal having the second frequency is not detected.

* * * * *